United States Patent
Yamagishi

(10) Patent No.: US 10,034,042 B2
(45) Date of Patent: Jul. 24, 2018

(54) CONTENT SUPPLY APPARATUS, CONTENT SUPPLY METHOD, PROGRAM, TERMINAL APPARATUS, AND CONTENT SUPPLY SYSTEM

(71) Applicant: Saturn Licensing LLC, New York, NY (US)

(72) Inventor: Yasuaki Yamagishi, Kanagawa (JP)

(73) Assignee: SATURN LICENSING LLC, New York, NY (US)

(*) Notice: Subject to any disclaimer, the term of this patent is extended or adjusted under 35 U.S.C. 154(b) by 0 days.

(21) Appl. No.: 14/917,186

(22) PCT Filed: Sep. 4, 2014

(86) PCT No.: PCT/JP2014/073351
§ 371 (c)(1),
(2) Date: Mar. 7, 2016

(87) PCT Pub. No.: WO2015/064210
PCT Pub. Date: May 7, 2015

(65) Prior Publication Data
US 2016/0198220 A1    Jul. 7, 2016

(30) Foreign Application Priority Data
Oct. 30, 2013  (JP) .................. 2013-225776

(51) Int. Cl.
*G06F 3/00*    (2006.01)
*G06F 13/00*   (2006.01)
(Continued)

(52) U.S. Cl.
CPC ....... *H04N 21/4384* (2013.01); *H04L 65/602* (2013.01); *H04N 21/2343* (2013.01);
(Continued)

(58) Field of Classification Search
CPC .......... H04N 21/4384; H04N 21/2343; H04N 21/23439; H04N 21/26258;
(Continued)

(56) References Cited

U.S. PATENT DOCUMENTS

2005/0066063 A1   3/2005   Gringorovitch et al.
2006/0282852 A1   12/2006  Purpura et al.
(Continued)

FOREIGN PATENT DOCUMENTS

RU    2 325 686 C2       5/2008
WO    WO 2013/112909 A1  8/2013

OTHER PUBLICATIONS

English Translation of KR 10-2013-0083074 of U.S. Pub. No. 2015/0020102 A1 to Yoo.*
(Continued)

*Primary Examiner* — Kyu Chae
(74) *Attorney, Agent, or Firm* — Oblon, McClelland, Maier & Neustadt, L.L.P.

(57) ABSTRACT

The present disclosure relates to a content supply apparatus, a content supply method, a program, a terminal apparatus, and a content supply system that allow to quickly check content delivered in DASH. A content supply apparatus of the present disclosure includes: a combining unit that generates mosaic CH streaming data by disposing and combining together video of a plurality of pieces of content delivered through viewing channels; a mosaic CH segment stream generating unit that generates a mosaic CH segment stream switchable to/from another mosaic channel at a minimum delay time, based on the mosaic CH streaming data; a USD generating unit that generates a USD having introduced therein a mosaic element related to a screen configuration of the mosaic CH segment stream; and a multicasting unit that multicasts the mosaic CH segment
(Continued)

stream and the USD. The present disclosure can be applied to a system that streams content.

19 Claims, 21 Drawing Sheets

(51) Int. Cl.
    *H04N 5/445* (2011.01)
    *H04N 21/438* (2011.01)
    *H04N 21/2343* (2011.01)
    *H04N 21/262* (2011.01)
    *H04N 21/845* (2011.01)
    *H04N 21/6405* (2011.01)
    *H04N 21/6408* (2011.01)
    *H04L 29/06* (2006.01)

(52) U.S. Cl.
    CPC . *H04N 21/23439* (2013.01); *H04N 21/26258* (2013.01); *H04N 21/6405* (2013.01); *H04N 21/6408* (2013.01); *H04N 21/845* (2013.01); *H04N 21/8456* (2013.01); *H04L 65/4084* (2013.01)

(58) Field of Classification Search
    CPC ........... H04N 21/6405; H04N 21/6408; H04N 21/845; H04N 21/8456
    See application file for complete search history.

(56) References Cited

U.S. PATENT DOCUMENTS

| | | | | |
|---|---|---|---|---|
| 2008/0168124 | A1* | 7/2008 | Lee | H04N 7/17318 709/201 |
| 2008/0318558 | A1* | 12/2008 | Bouazizi | H04L 12/189 455/414.1 |
| 2010/0115554 | A1* | 5/2010 | Drouet | H04N 5/44543 725/41 |
| 2012/0259994 | A1 | 10/2012 | Gillies et al. | |
| 2015/0020102 | A1* | 1/2015 | Yoo | H04N 21/23436 725/41 |

OTHER PUBLICATIONS

"MI-EMO Use Case—Zapping Portal Services," 3GPP TSG-SA4 #74, http://www.3gpp.org/ftp/tsg_sa/WG4_CODEC/TSGS4_74/Docs/S4-130628.zip, Jul. 2013, (5 pages).

"SA4#75 MBS SWG Meeting report," 3GPP TSG SA WG4 #75, http://www.3gpp.org/ftp/tsg_sa/WG4_CODEC/TSGS4_75/Docs/S4-131106.zip, Sep. 2013, (6 pages).

Mitsuhiro Hirabayashi, "Realizing the Uninterrupted Video Distribution in the Existing Web Server; An Exposition on 'MPEG-DASH', the Next-Generation Standard of Video Distribution," Nikkei Electronics, Mar. 19, 2012, (21 pages with English translation).

International Search Report issued Dec. 2, 2014 in PCT/JP2014/073351 filed Sep. 4, 2014.

Extended European Search Report issued on Apr. 24, 2017 in Patent Application No. 14857707.5.

"MI-EMO Proposed Updates on Mosaic Service and Zapping Portal" Sony Corporation, 3GPP TSG-Meeting #75, S4-130967, Retrieved from the Internet: URL:http://www.3gpp.org/ftp/tsg_sa/WG4_CODEC/TSGS4_75/Docs/, XP050727602, Sep. 17, 2013, pp. 1-3.

"MI-EMO: On Signaling Fast Zap Video or Mosaic Service" Sony Corporation, 3GPP TSG-SA4 Meeting #76, S4-131218, Retrieved for the Internet: URL:http://www.3gpp.org/ftp/tsg_sa/WG4_CODEC/TSGS4_76/Docs/, XP050766879, Oct. 29, 2013, pp. 1-2.

"3$^{rd}$ Generation Partnership Project; Technical Specification Group Services and System Aspects; Multimedia Broadcast/Multicast Service (MBMS); Enhanced MBMS Operation (Release 12)" 3GPP TR 26.848, V0.5.1-EMO-RM, Retrieved from the Internet: URL:http://www.3gpp.org/ftp/tsg_sa/WG4_CODEC/TSGS4_75/Docs/, XP050727842, Sep. 27, 2013, pp. 1-26.

Office Action dated Dec. 25, 2017 issued in Russian Patent Application No. 2016115980/07(025054).

Search Report dated Dec. 25, 2017 issued in Russian Patent Application No. 2016115980/07(025054).

Qualcomm Incorporated et al; Rationale for USD Indication of DASH Delivery Mode and Illustrative, 3GPP TSG-SA4 #72, S4-130196, Valencia, Jan. 28-Feb. 1, 2013.

* cited by examiner

```
<bundleDescription>
<userServiceDescription>
...
 <mosaic>            (mosaic ELEMENT)
  <html> (EXTENDED HTML ELEMENT)
   <head>
   <Style type="text/css">
   <!--
   div.Base {position:absolute; top:0px; left:0px; width:1920px; height:1080px;}
   div.C1Area {position:absolute; top:0px; left:0px; width:960px; height:540px;}
   div.C2Area {position:absolute; top:0px; left:960px; width:960px; height:540px;}
   div.C3Area {position:absolute; top:540px; left:0px; width:960px; height:540px;}
   div.C4Area {position:absolute; top:540px; left:960px; width:960px; height:540px;}
   -->
   </Style>
   </head>
   <body>
    <div class=" Base" >
     <div class=" C1Area" >
      <audio ···xlink:actuate="onLoad" xlink:type="simple" xlink:href="http://example.com/c.mpd#Id-C1a"/>
      <video ··· xlink:type="simple" xlink:href="http://a.com/C1mpd.mpd#Id-v"/>
      <audio ··· xlink:type="simple" xlink:href="http://a.com/C1mpd.mpd#Id-a"/>
       </div>
     <div class=" C2Area" >
      <audio ···xlink:actuate="onLoad" xlink:type="simple" xlink:href="http://example.com/c.mpd#Id-C2a"/>
      <video ··· xlink:type="simple" xlink:href="http://a.com/C2mpd.mpd#Id-v"/>
      <audio ··· xlink:type="simple" xlink:href="http://a.com/C2mpd.mpd#Id-a"/>
       </div>
     <div class=" C3Area" >
      <audio ···xlink:actuate="onLoad" xlink:type="simple" xlink:href="http://example.com/c.mpd#Id-C3a"/>
      <video ··· xlink:type="simple" xlink:href="http://a.com/C3mpd.mpd#Id-v"/>
      <audio ··· xlink:type="simple" xlink:href="http://a.com/C3mpd.mpd#Id-a"/>
       </div>
     <div class=" C4Area" >
      <audio ···xlink:actuate="onLoad" xlink:type="simple" xlink:href="http://example.com/c.mpd#Id-C4a"/>
      <video ··· xlink:type="simple" xlink:href="http://a.com/C4mpd.mpd#Id-v"/>
      <audio ··· xlink:type="simple" xlink:href="http://a.com/C4mpd.mpd#Id-a"/>
       </div>
      </div>
    </body>
   </html>
  </mosaic>
 ...
</userServiceDescription>
</bundleDescription>
```

FIG. 12

```
<MPD>
<BaseURL>http://example.com/</BaseURL>
  :
<Period ...>
  <AdaptationSet ...> -- Video
    <Representation id="Id-v" ...> (BODY OF MOSAIC CH SEGMENT STREAM)
      :
    </Representation>
      :
  </AdaptationSet>
  <AdaptationSet ...> -- Audio
    <Representation id="Id-C1a" .../> (PLAYED BACK WHEN FOCUS IS MOVED TO C1 AREA)
    <Representation id="Id-C2a" .../> (PLAYED BACK WHEN FOCUS IS MOVED TO C2 AREA)
    <Representation id="Id-C3a" .../> (PLAYED BACK WHEN FOCUS IS MOVED TO C3 AREA)
    <Representation id="Id-C4a" .../> (PLAYED BACK WHEN FOCUS IS MOVED TO C4 AREA)
  </AdaptationSet>
</Period>
  :
</MPD>
```

FIG. 13

```
<bundleDescription>
<userServiceDescription>
...
<mosaic> (mosaic ELEMENT)
<html-ref href=" http://example.com/html.html"  mosaic-mpd-ref "http://example.com/
c.mpd#Id-v" >
</mosaic>
...
</userServiceDescription>
</bundleDescription>
```

FIG. 14

```
<html> (EXTENDED HTML ELEMENT)
<head>
<Style type="text/css">
  <!--
  div.Base {position:absolute; top:0px; left:0px; width:1920px; height:1080px;}
  div.C1Area {position:absolute; top:0px; left:0px; width:960px; height:540px;}
  div.C2Area {position:absolute; top:0px; left:960px; width:960px; height:540px;}
  div.C3Area {position:absolute; top:540px; left:0px; width:960px; height:540px;}
  div.C4Area {position:absolute; top:540px; left:960px; width:960px; height:540px;}
  -->
</Style>
</head>
<body>
<div class=" Base" >
 <div class=" C1Area" >
  <audio ···xlink:actuate="onLoad" xlink:type="simple" xlink:href="http://example.com/c.mpd#Id-C1a"/>
  <video ··· xlink:type="simple" xlink:href="http://a.com/C1mpd.mpd#Id-v"/>
  <audio ··· xlink:type="simple" xlink:href="http://a.com/C1mpd.mpd#Id-a"/>
  </div>
 <div class=" C2Area" >
  <audio ···xlink:actuate="onLoad" xlink:type="simple" xlink:href="http://example.com/c.mpd#Id-C2a"/>
  <video ··· xlink:type="simple" xlink:href="http://a.com/C2mpd.mpd#Id-v"/>
  <audio ··· xlink:type="simple" xlink:href="http://a.com/C2mpd.mpd#Id-a"/>
  </div>
 <div class=" C3Area" >
  <audio ···xlink:actuate="onLoad" xlink:type="simple" xlink:href="http://example.com/c.mpd#Id-C3a"/>
  <video ··· xlink:type="simple" xlink:href="http://a.com/C3mpd.mpd#Id-v"/>
  <audio ··· xlink:type="simple" xlink:href="http://a.com/C3mpd.mpd#Id-a"/>
  </div>
 <div class=" C4Area" >
  <audio ···xlink:actuate="onLoad" xlink:type="simple" xlink:href="http://example.com/c.mpd#Id-C4a"/>
  <video ··· xlink:type="simple" xlink:href="http://a.com/C4mpd.mpd#Id-v"/>
  <audio ··· xlink:type="simple" xlink:href="http://a.com/C4mpd.mpd#Id-a"/>
  </div>
 </div>
</body>
</html>
```

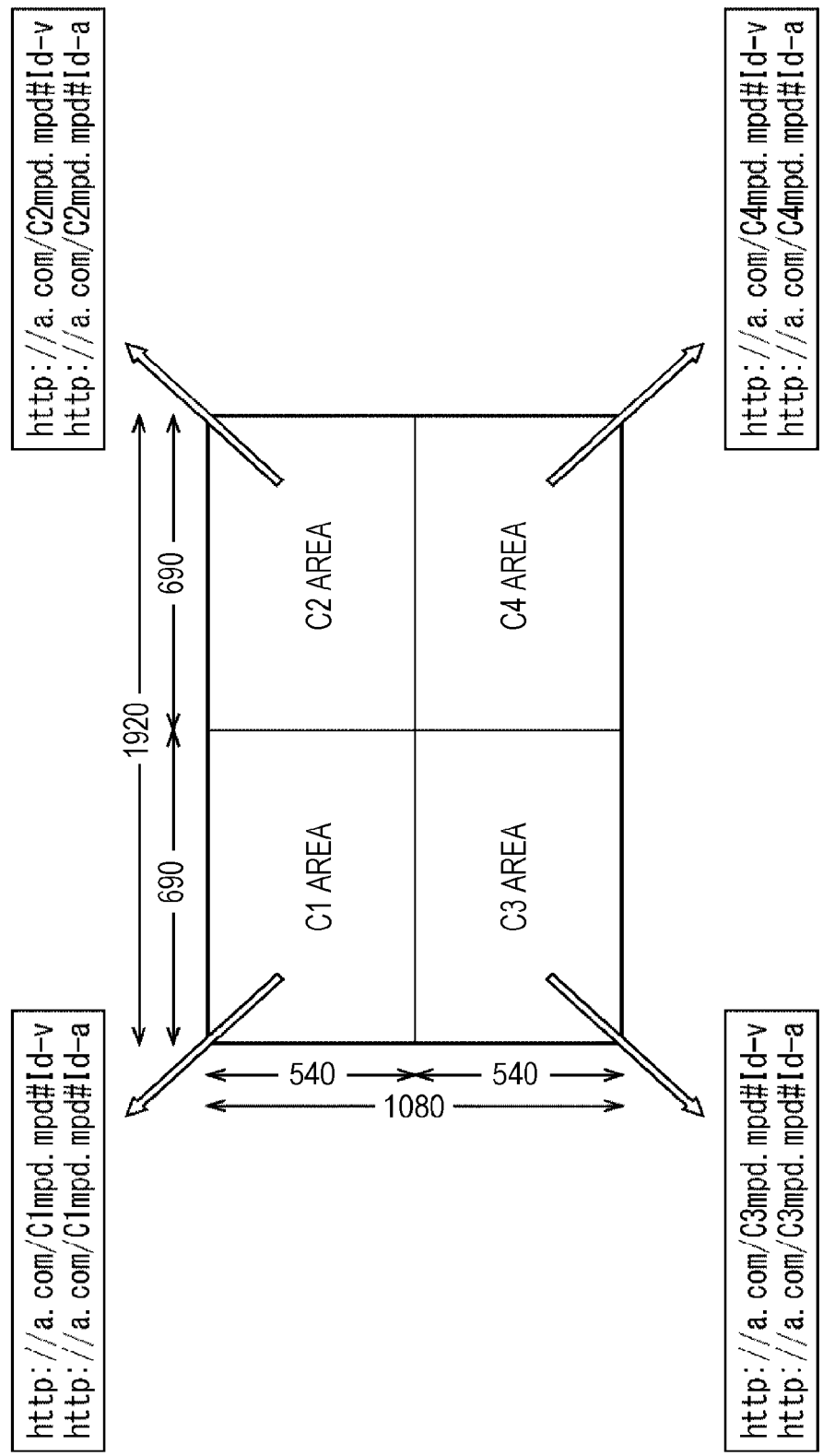

FIG. 16

```
<bundleDescription NTPSynchronized="true" SegmentAligned="true"
 xmlns:r7="urn:3GPP:metadata:2007:MBMS:userServiceDescription"
 xmlns:r9="urn:3GPP:metadata:2009:MBMS:userServiceDescription" ...>
  <userServiceDescription ...
   xmlns:r7="urn:3GPP:metadata:2007:MBMS:userServiceDescription"
   xmlns:r9="urn:3GPP:metadata:2009:MBMS:userServiceDescription"
   r7:serviceClass="urn:streamType:forZapping" ...>
    <deliveryMethod sessionDescriptionURI="(URL OF SDP)" />
    <r9:mediaPresentationDescription mpdURI="(URL OF MPD)"
    :
  </userServiceDescription>
    :
</bundleDescription>
```

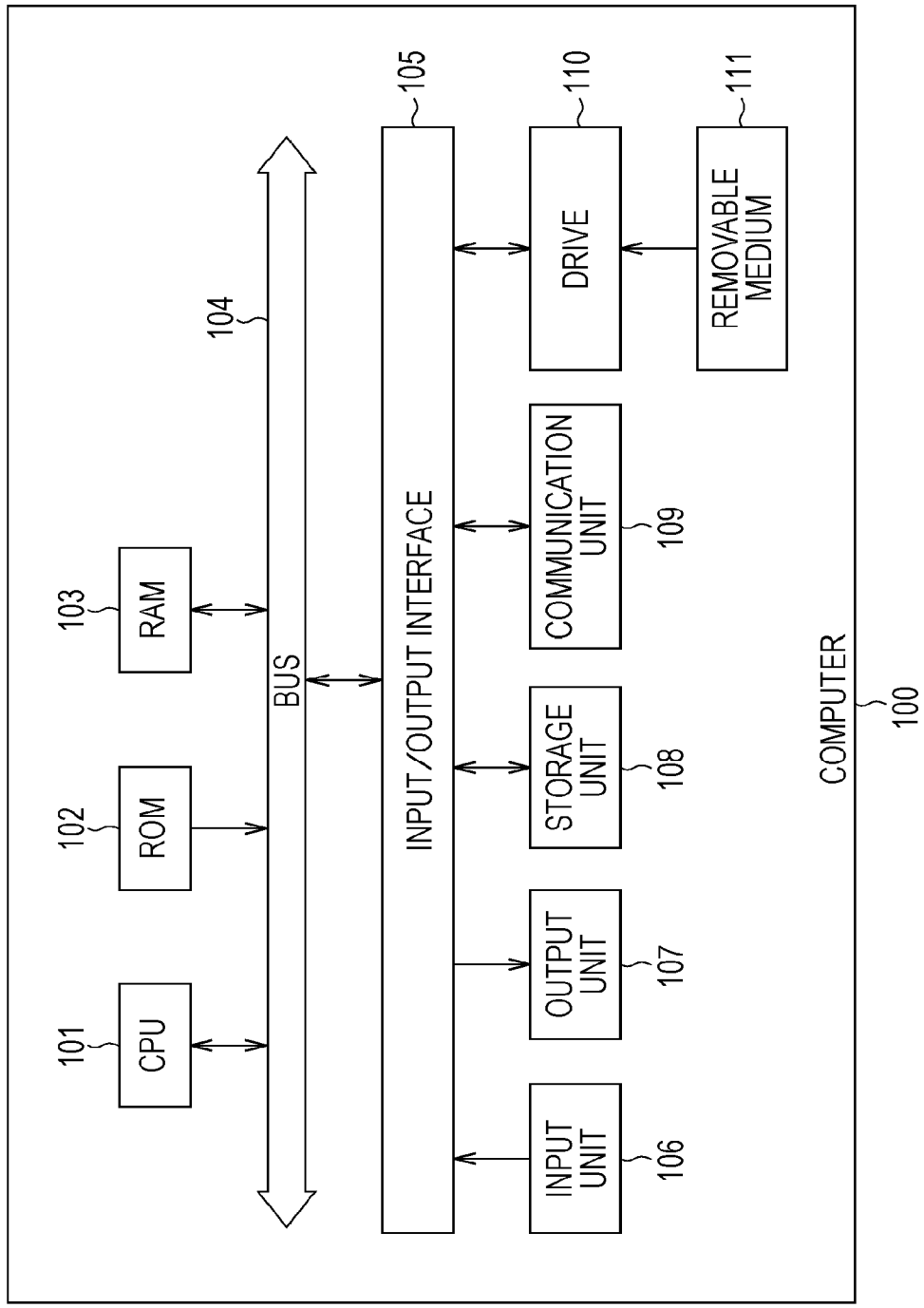

CONTENT SUPPLY APPARATUS, CONTENT SUPPLY METHOD, PROGRAM, TERMINAL APPARATUS, AND CONTENT SUPPLY SYSTEM

TECHNICAL FIELD

The present disclosure relates to a content supply apparatus, a content supply method, a program, a terminal apparatus, and a content supply system, and more particularly to a content supply apparatus, a content supply method, a program, a terminal apparatus, and a content supply system that allow to quickly check pieces of content delivered through a plurality of different channels, respectively.

BACKGROUND ART

In recent years, Over The Top Video (OTT-V) has become the mainstream of streaming service that uses the Internet. As an internationally standardized moving image delivery protocol that can be used for OTT-V, there is known Moving Picture Experts Group-Dynamic Adaptive Streaming over HTTP (MPEG-DASH; hereinafter, referred to as DASH) that uses the same HTTP as that for browsing Web sites, etc. (see, for example, Non-Patent Document 1).

In DASH, an adaptive streaming technique is implemented. Specifically, a content supplier prepares and delivers a plurality of streams of the same content with different bit rates for different image qualities, different angle-of-view sizes, etc. On the other hand, a content receiver selects an optimal stream from among the plurality of streams prepared by the supplier, according to a communication environment, decoding capability thereof, etc., and receives and plays back the selected stream, and further switches the stream being received to another according to a change in the communication environment, etc.

Note that the content supplier supplies a metafile called a Media Presentation Description (MPD) to the receiver so that the receiver can adaptively select, receive, and play back a stream.

The MPD describes an address (url information) of a WEB server (supply source) that supplies files of segment streams where content streams (media data such as Audio/Video/Subtitle) are chunked, in response to a request from the receiver. Based on the url information, the receiver accesses the WEB server serving as the content supply source, to request a file of a segment stream (hereinafter, also referred to as segment file), and receives and plays back the segment file which is HTTP-unicast from the server in response to the request.

FIG. 1 shows an example of a configuration of a content supply system that streams content based on DASH.

This content supply system 10 is composed of a plurality of viewing CH apparatuses 20 (20A, 20B, and 20C in this case) corresponding to respective channels through which content is delivered; and multiple DASH clients 30 which are the receiving side of the content. The DASH clients 30 can be connected to the viewing CH apparatuses 20 through a Contents Delivery Network (CDN) 12 that uses Internet 11.

The viewing CH apparatus 20A delivers, as a channel A, pieces of content of the same content by a plurality of streams with different bit rates. Likewise, the viewing CH apparatus 20B delivers, as a channel B, pieces of content of the same content that differ from the pieces of content of the channel A, by a plurality of streams with different bit rates. The viewing CH apparatus 20C is also the same. In the following, when the viewing CH apparatuses 20A, 20B, and 20C do not need to be individually distinguished from each other, they are simply referred to as the viewing CH apparatuses 20.

Each viewing CH apparatus 20 includes a content management server 21, a DASH segment streamer 22, and a DASH MPD server 23.

The content management server 21 manages source data of content which is supplied to the DASH clients 30, and generates a plurality of pieces of streaming data with different bit rates from the source data, and outputs the plurality of pieces of streaming data to the DASH segment streamer 22.

The DASH segment streamer 22 divides each piece of streaming data into segments in a temporal manner, and thereby generates a segment stream, e.g., fragmented MP4, and converts the segment stream into a file format on a segment-by-segment basis and holds the files, and notifies the DASH MPD server 23 of an address of a supply source of the files, as metadata. Furthermore, in response to an HTTP request from a DASH client 30 to request a file of a segment stream (hereinafter, also referred to as segment file), the DASH segment streamer 22 HTTP-unicasts, as a WEB server, the segment file to the request source.

The DASH MPD server 23 generates an MPD that describes, for example, the address indicating the supply source (i.e., the DASH segment streamer 22) of the segment files. In addition, in response to an HTTP request from the DASH client 30 to request an MPD, the DASH MPD server 23 HTTP-unicasts, as a WEB server, the generated MPD to the request source.

A DASH client 30 requests the DASH MPD server 23 for an MPD, and obtains the MPD which is HTTP-unicast in response to the request. In addition, based on the obtained MPD, the DASH client 30 requests the DASH segment streamer 22 for a segment file, and receives and plays back the segment file which is HTTP-unicast in response to the request.

Note that the CDN 12 includes a cache server (not shown), and the cache server caches MPDs and files of segment streams which are HTTP-unicast through the CDN 12. Then, instead of the DASH MPD server 23 or the DASH segment streamer 22 which serves as a WEB server, the cache server can HTTP-unicast a cached MPD or file of a segment stream to the DASH client 30 which is a request source.

CITATION LIST

Non-Patent Document

Non-Patent Document 1: "Achieving Uninterrupted Video Streaming Using Existing Web Servers", Mitsuhiro Hirabayashi, NIKKEI ELECTRONICS Mar. 19, 2012

SUMMARY OF THE INVENTION

Problems to be Solved by the Invention

As described above, in the content supply system shown in FIG. 1, by preparing the plurality of viewing CH apparatuses 20, the DASH clients 30 can select, receive, and play back content delivered through each of a plurality of channels.

When viewing can be thus performed by making a selection from among channels through which pieces of content of different content are delivered, it is assumed that, as with when a viewer (a user of a DASH client 30) views television broadcasts, in order to find content to view, the viewer performs so-called zapping (the operation of switching channels one after another in a short period of time to find content to view).

Note that switching of a segment stream between channels in DASH is performed on a segment-by-segment basis or a subsegment-by-subsegment basis, the subsegment being obtained by further fragmenting the segment. In the following, description is continued assuming that switching of a segment stream between channels in DASH is performed on a segment-by-segment basis.

FIGS. 2 and 3 show a state of switching for when zapping is performed between channels, where each of channels A, B, and C in DASH prepares three segment streams (Representations) of pieces of content of the same content with different bit rates.

Note that in DASH the segment length (time length) of segment streams generated by each channel is any, and the segment length does not always match between channels. Note also that the playback start time of the first segment of content does not always match between channels.

FIG. 2 shows an example of the case in which the segment length does not match between channels and the playback start time of the first segment of content does not match between channels, either.

In this case, even if a user of a DASH client 30 instructs to perform switching (zapping) to a Representation B2 of the channel B before T1 of a DASH client time base while viewing a Representation A2 of the channel A, the switching is delayed to T2 which is a limit of a segment of the Representation B2. Furthermore, even if the user instructs to perform switching to a Representation C2 of the channel C before reaching T3 while viewing the Representation B2 of the channel B, the switching is delayed to T4 which is a limit of a segment of the Representation C2.

FIG. 3 shows an example of the case in which the playback start time of the first segment of content is allowed to match between channels in synchronization with an NTP time base, and the segment length does not match between channels.

In this case, too, even if the user of the DASH client 30 instructs to perform switching to a Representation B2 of the channel B before T1 of the NTP time base while viewing a Representation A2 of the channel A, the switching is delayed to T2 which is a limit of a segment of the Representation B2. Furthermore, even if the user instructs to perform switching to a Representation C2 of the channel C before reaching T3 while viewing the Representation B2 of the channel B, the switching is delayed to T4 which is a limit of a segment of the Representation C2.

As shown in FIGS. 2 and 3, when a segment stream is switched between channels in DASH, unnecessary delay may occur. Accordingly, quick zapping cannot be performed between channels.

Note that if the segment length of segment streams of each channel is made extremely short, the above-described unnecessary delay time can be reduced without allowing the playback start times of the first segments of content to match one another in synchronization with the NTP time base or allowing the segment length to match between channels. In that case, however, encoding efficiency degrades and thus the amount of data of segment streams increases, requiring a wider communication band. Accordingly, excess load is applied to the Internet 11, which may cause degradation of delivery service quality.

The present disclosure is made in view of such circumstances and is to allow to quickly check a plurality of pieces of content delivered through a plurality of channels.

Solutions to Problems

According to a first aspect of the present disclosure, in a content supply apparatus that delivers content as a mosaic channel, the content supply apparatus includes: a combining unit that generates mosaic CH streaming data by disposing pieces of video of a plurality of pieces of content in a plurality of areas, respectively, and combining the pieces of video together, the plurality of pieces of content being delivered through different viewing channels, and the plurality of areas being obtained by dividing a screen; a mosaic CH segment stream generating unit that generates a mosaic CH segment stream based on the generated mosaic CH streaming data, the mosaic CH segment stream being switchable to/from another mosaic channel at a minimum delay time; a USD generating unit that generates a USD having introduced therein a mosaic element related to a screen configuration of the mosaic CH segment stream; and a multicasting unit that multicasts the mosaic CH segment stream and the USD.

The USD generating unit may generate, as the USD, an extended-HTML inclusion type USD including an extended HTML element, or an extended-HTML reference type USD including a reference to a file of the extended HTML element, the extended HTML element describing information about the screen configuration of the mosaic CH segment stream.

The content supply apparatus according to the first aspect of the present disclosure may further include a unicasting unit that unicasts the mosaic CH segment stream and the USD.

The content supply apparatus according to the first aspect of the present disclosure may further include an MPD generating unit that generates an MPD, the MPD being information for a receiver to receive the mosaic CH segment stream, the multicasting unit may also multicast the MPD, and the unicasting unit may also unicast the MPD.

The USD generating unit may generate the USD in which an attribute is extended, the attribute indicating that the mosaic CH segment stream is switchable to/from another mosaic channel at the minimum delay time.

The mosaic CH segment stream generating unit may generate the mosaic CH segment stream by dividing the generated mosaic CH streaming data according to timing and segment length, the mosaic CH segment stream being switchable to/from another mosaic channel at the minimum delay time, and the timing and the segment length being uniform between the mosaic channel and the another mosaic channel.

The mosaic CH segment stream generating unit may generate the mosaic CH segment stream by making a cycle of switchable boundaries of the generated mosaic CH streaming data sufficiently short, the mosaic CH segment stream being switchable to/from another mosaic channel at the minimum delay time.

The unicasting unit may HTTP-unicast the mosaic CH segment stream, and the multicasting unit may FLUTE-multicast a mosaic CH FLUTE stream generated based on the mosaic CH segment stream.

The content supply apparatus according to the first aspect of the present disclosure may further include an RTP stream generating unit that generates a mosaic CH RTP stream based on the mosaic CH streaming data, and the multicasting unit may also RTP-multicast the mosaic CH RTP stream.

According to the first aspect of the present disclosure, in a content supply method for a content supply apparatus that delivers content as a mosaic channel, the content supply method includes: a combining step of generating mosaic CH streaming data by disposing pieces of video of a plurality of pieces of content in a plurality of areas, respectively, and combining the pieces of video together, the plurality of pieces of content being delivered through different viewing channels, and the plurality of areas being obtained by dividing a screen; a mosaic CH segment stream generating step of generating a mosaic CH segment stream, based on the generated mosaic CH streaming data, the mosaic CH segment stream being switchable to/from another mosaic channel at a minimum delay time; a USD generating step of generating a USD having introduced therein a mosaic element related to a screen configuration of the mosaic CH segment stream; and a multicasting step of multicasting the mosaic CH segment stream and the USD, the steps being performed by the content supply apparatus.

According to the first aspect of the present disclosure, a program causes a computer that delivers content as a mosaic channel, to function as: a combining unit that generates mosaic CH streaming data by disposing pieces of video of a plurality of pieces of content in a plurality of areas, respectively, and combining the pieces of video together, the plurality of pieces of content being delivered through different viewing channels, and the plurality of areas being obtained by dividing a screen; a mosaic CH segment stream generating unit that generates a mosaic CH segment stream, based on the generated mosaic CH streaming data, the mosaic CH segment stream being switchable to/from another mosaic channel at a minimum delay time; a USD generating unit that generates a USD having introduced therein a mosaic element related to a screen configuration of the mosaic CH segment stream; and a multicasting unit that multicasts the mosaic CH segment stream and the USD.

In the first aspect of the present disclosure, mosaic CH streaming data is generated by disposing pieces of video of a plurality of pieces of content delivered through different viewing channels, in a plurality of areas, respectively, and combining the pieces of video together, the areas being obtained by dividing a screen. Based on the generated mosaic CH streaming data, a mosaic CH segment stream switchable to/from another mosaic channel at a minimum delay time is generated. A USD having introduced therein a mosaic element related to a screen configuration of the mosaic CH segment stream is generated. The mosaic CH segment stream and the USD are multicast.

According to a second aspect of the present disclosure, a terminal apparatus that receives and plays back content delivered as a mosaic channel from a content supply apparatus includes: a combining unit that generates mosaic CH streaming data by disposing pieces of video of a plurality of pieces of content in a plurality of areas, respectively, and combining the pieces of video together, the plurality of pieces of content being delivered through different viewing channels, and the plurality of areas being obtained by dividing a screen; a mosaic CH segment stream generating unit that generates a mosaic CH segment stream, based on the generated mosaic CH streaming data, the mosaic CH segment stream being switchable to/from another mosaic channel at a minimum delay time; a USD generating unit that generates a USD having introduced therein a mosaic element related to a screen configuration of the mosaic CH segment stream; and a multicasting unit that multicasts the mosaic CH segment stream and the USD, the terminal apparatus being configured to receive the USD and the mosaic CH segment stream, and receive and play back, according to a user operation to select an area on the screen, a stream of content of a viewing channel corresponding to the selected area, the screen playing back the mosaic CH segment stream.

In the second aspect of the present disclosure, a USD and a mosaic CH segment stream are received. According to a user operation to select an area on a screen that plays back the mosaic CH segment stream, a stream of content of a viewing channel corresponding to the selected area is received and played back.

According to a third aspect of the present disclosure, in a content supply system including: a content supply apparatus that delivers content as a mosaic channel; and a terminal apparatus that receives and plays back the content delivered from the content supply apparatus, the content supply apparatus includes: a combining unit that generates mosaic CH streaming data by disposing pieces of video of a plurality of pieces of content in a plurality of areas, respectively, and combining the pieces of video together, the plurality of pieces of content being delivered through different viewing channels, and the plurality of areas being obtained by dividing a screen; a mosaic CH segment stream generating unit that generates a mosaic CH segment stream based on the generated mosaic CH streaming data, the mosaic CH segment stream being switchable to/from another mosaic channel at a minimum delay time; a USD generating unit that generates a USD having introduced therein a mosaic element related to a screen configuration of the mosaic CH segment stream; and a multicasting unit that multicasts the mosaic CH segment stream and the USD. On the other hand, the terminal apparatus is configured to receive the USD and the mosaic CH segment stream, and receive and play back, according to a user operation to select an area on the screen, a stream of content of a viewing channel corresponding to the selected area, the screen playing back the mosaic CH segment stream.

In the third aspect of the present disclosure, the content supply apparatus generates mosaic CH streaming data by disposing pieces of video of a plurality of pieces of content delivered through different viewing channels, in a plurality of areas, respectively, and combining the pieces of video together, the areas being obtained by dividing a screen, generates a mosaic CH segment stream switchable to/from another mosaic channel at a minimum delay time, based on the generated mosaic CH streaming data, generates a USD having introduced therein a mosaic element related to a screen configuration of the mosaic CH segment stream, and multicasts the mosaic CH segment stream and the USD. On the other hand, the terminal apparatus receives the USD and the mosaic CH segment stream, and receives and plays back, according to a user operation to select an area on the screen that plays back the mosaic CH segment stream, a stream of content of a viewing channel corresponding to the selected area.

Effects of the Invention

According to the first to third aspects of the present disclosure, a plurality of pieces of content delivered through a plurality of different viewing channels can be checked quickly.

BRIEF DESCRIPTION OF DRAWINGS

FIG. 8 is a diagram showing the disposition of a USD in MBMS.

FIG. 11 is a diagram showing an example of the extended-HTML inclusion type mosaic CH USD.

FIG. 12 is a diagram showing an example of a mosaic CH MPD.

FIG. 13 is a diagram showing an example of the extended-HTML reference type mosaic CH USD.

FIG. 14 is a diagram showing an example of a file of an extended HTML element.

FIG. 15 is a diagram specifically describing the content of the extended HTML element.

FIG. 16 is a flowchart describing the processes of a mosaic CH apparatus.

FIG. 21 is a block diagram showing an exemplary configuration of a computer.

MODE FOR CARRYING OUT THE INVENTION

The best mode for carrying out the present disclosure (hereinafter, referred to as embodiment) will be described below, but before that, a summary of the present disclosure will be described with reference to FIGS. 4 and 5.

<Summary of the Present Disclosure>

Figure 4:
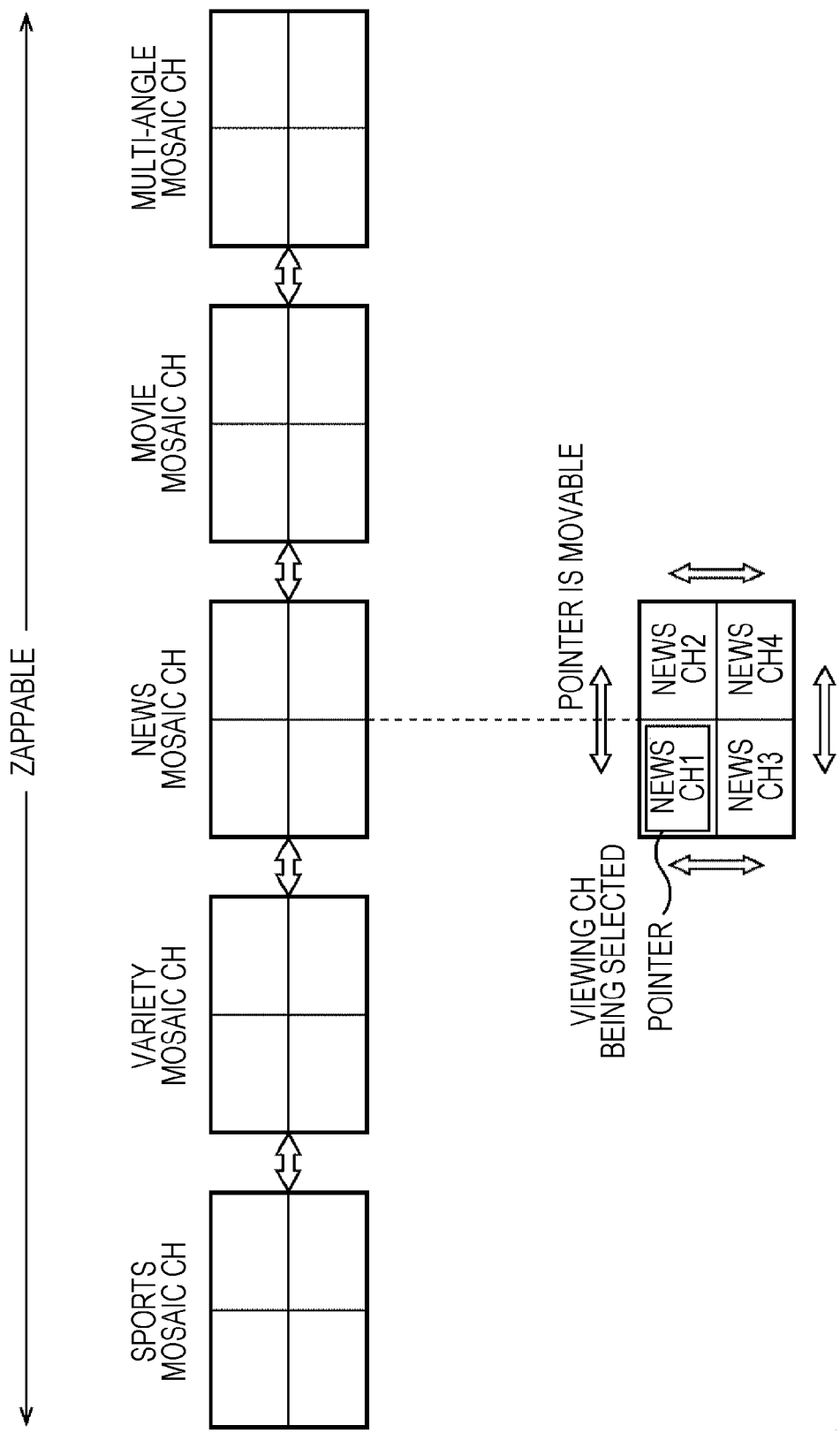
FIG. 4 is a diagram showing mosaic channel combining examples.

FIG. 4 shows exemplary display of screens of mosaic channels (CHs) which are delivered by mosaic CH apparatuses 60 of a content supply system 50 (FIG. 6) which is an embodiment of the present disclosure.

Here, the mosaic channel is a channel used to deliver a mosaic CH stream, and the mosaic CH stream is a stream where video of a plurality of pieces of content delivered from viewing CH apparatuses 20, respectively, which correspond to normal channels (hereinafter, also referred to as viewing channels) is combined together. A screen for video of a mosaic CH stream is divided into a plurality of areas, and pieces of video of content of different viewing channels are disposed in the respective areas.

Therefore, by viewing a mosaic channel screen, video of content of a plurality of viewing channels can be checked simultaneously.

Note that although, in the example of FIG. 4, video streams of content delivered through four viewing channels are combined together in a mosaic CH stream, the number of video streams forming a mosaic CH stream, i.e., the number of divisions of a mosaic channel screen, is not limited to 4, and may be, for example, 6 (=3×2 or 2×3) or 9 (=3×3).

A mosaic CH stream of each mosaic channel is formed by combining together video streams of a plurality of pieces of content which are grouped by genre (e.g., sports, variety, news, and movies).

In addition, a mosaic CH stream of a multi-angle mosaic channel may be formed by combining together a plurality of different video streams which are delivered as a single piece of content and which are selectable by a receiver (a plurality of pieces of video of a shooting target, such as a concert venue, which is shot from a plurality of different positions, a plurality of pieces of video shot in different directions from one location, or the like).

A terminal apparatus 80 that receives and plays back a mosaic channel (FIG. 6) can simultaneously check video of a plurality of (four in the case of FIG. 4) viewing channels on a mosaic channel screen. In addition, by zapping between a plurality of mosaic channels, video of more viewing channels can be checked in a short period of time.

Zapping between mosaic channels which is performed by the terminal apparatus 80 can be instructed, for example, by an operation on a channel up or down button of a remote control. Furthermore, on each mosaic channel screen, for example, a pointer is moved to any of a plurality of areas on the screen, according to an operation on an up, down, left, or right button of the remote control, by which the area can be focused, and furthermore, the focused area can be selected by an operation on a select button.

When any of the plurality of areas on the mosaic channel screen is focused, audio for video displayed in the area is outputted. Furthermore, when the area is selected, switching to a viewing channel corresponding to the video displayed in the area is performed, and a segment stream delivered through the viewing channel is received and played back.

Figure 5:
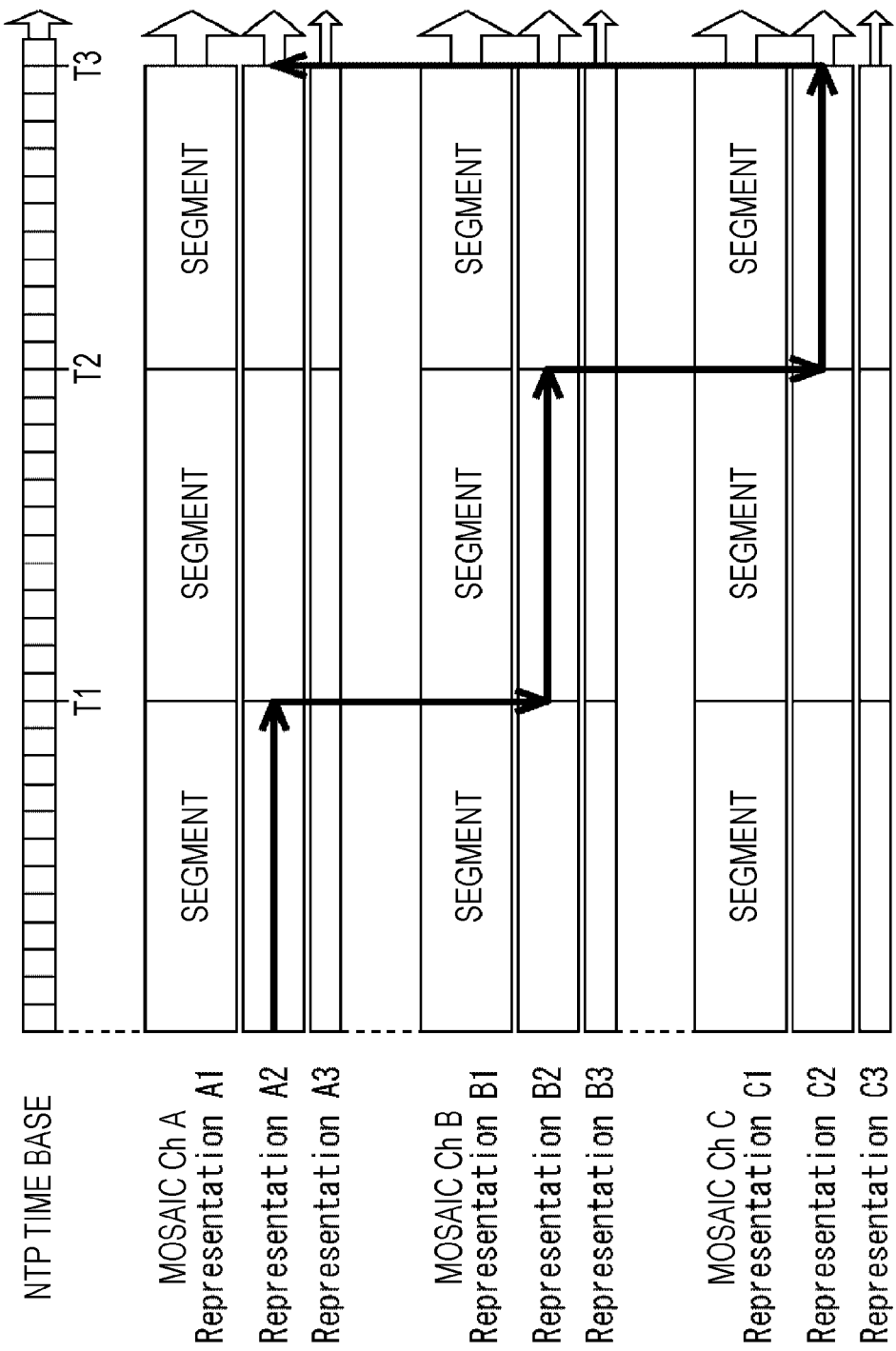
FIG. 5 is a diagram describing switching between mosaic channels.

FIG. 5 shows a state of switching for when zapping is performed between mosaic channels.

The drawing shows that each of mosaic channels A, B, and C prepares three segment streams (Representations) with different bit rates.

In the content supply system 50 to which the present disclosure is applied (FIG. 6), segment streams of each mosaic channel are such that the limits of segments are synchronized with an NTP time base, and the segment length is uniform between a plurality of mosaic channels. Furthermore, the starting points of media playback times at the beginning of segments (MPD/@availabilityStartTime+Period/@start) match on the NTP time base.

By this, in the terminal apparatus 80, when switching to a Representation B2 of the mosaic channel B is instructed before T1 of a DASH client time base while a Representation A2 of the mosaic channel A is viewed, the switching is performed at T1 which is a limit of a segment of the Representation A2 and is also a limit of a segment of the Representation B2.

In addition, when switching to a Representation C2 of the mosaic channel C is instructed before T2 while the Representation B2 of the mosaic channel B is viewed, the switching is performed at T2 which is a limit of the segment of the Representation B2 and is also a limit of a segment of the Representation C2. Furthermore, when switching to the Representation A2 of the mosaic channel A is instructed before T3 while the Representation C2 of the mosaic channel C is viewed, the switching is performed at T3 which is a limit of the segment of the Representation C2 and is also a limit of a segment of the Representation A2.

As such, in the present embodiment, zapping can be performed between a plurality of mosaic channels while the occurrence of unnecessary delay is inhibited.

Note that in the present embodiment a mosaic CH stream of a mosaic channel is supplied as a segment stream to the terminal apparatuses 80 not only by HTTP-unicast, but also by FLUTE-multicast and RTP-multicast.

A viewing CH stream of a viewing channel is HTTP-unicast as a segment stream.

An MPD which is metadata required for the terminal apparatuses 80 to receive a mosaic CH stream and a viewing CH stream which are HTTP-unicast, is supplied not only by HTTP-unicast, but also by FLUTE-multicast and UPD-multicast (overlay multicast).

Furthermore, a User Service Description (USD) serving as announcement information which is required to receive a mosaic CH stream which is FLUTE-multicast is generated and FLUTE-multicast. Moreover, the USD is converted into a file format and is HTTP-unicast as a USD file.

Then, in the terminal apparatuses 80, when a mosaic channel is received and played back, a mosaic CH stream which is multicast is received and played back using a USD and an MPD which are multicast, wherever possible. If this cannot be performed, a mosaic CH stream which is multicast is received and played back using a USD file and an MPD which are HTTP-unicast. If this cannot be performed, either, a mosaic CH stream which is HTTP-unicast is received and played back using a USD file and an MPD which are HTTP-unicast. By this, it is possible to inhibit excess load from being applied to the Internet or inhibit degradation of service quality from being caused.

<Exemplary Configuration of the Content Supply System>

Figure 6:
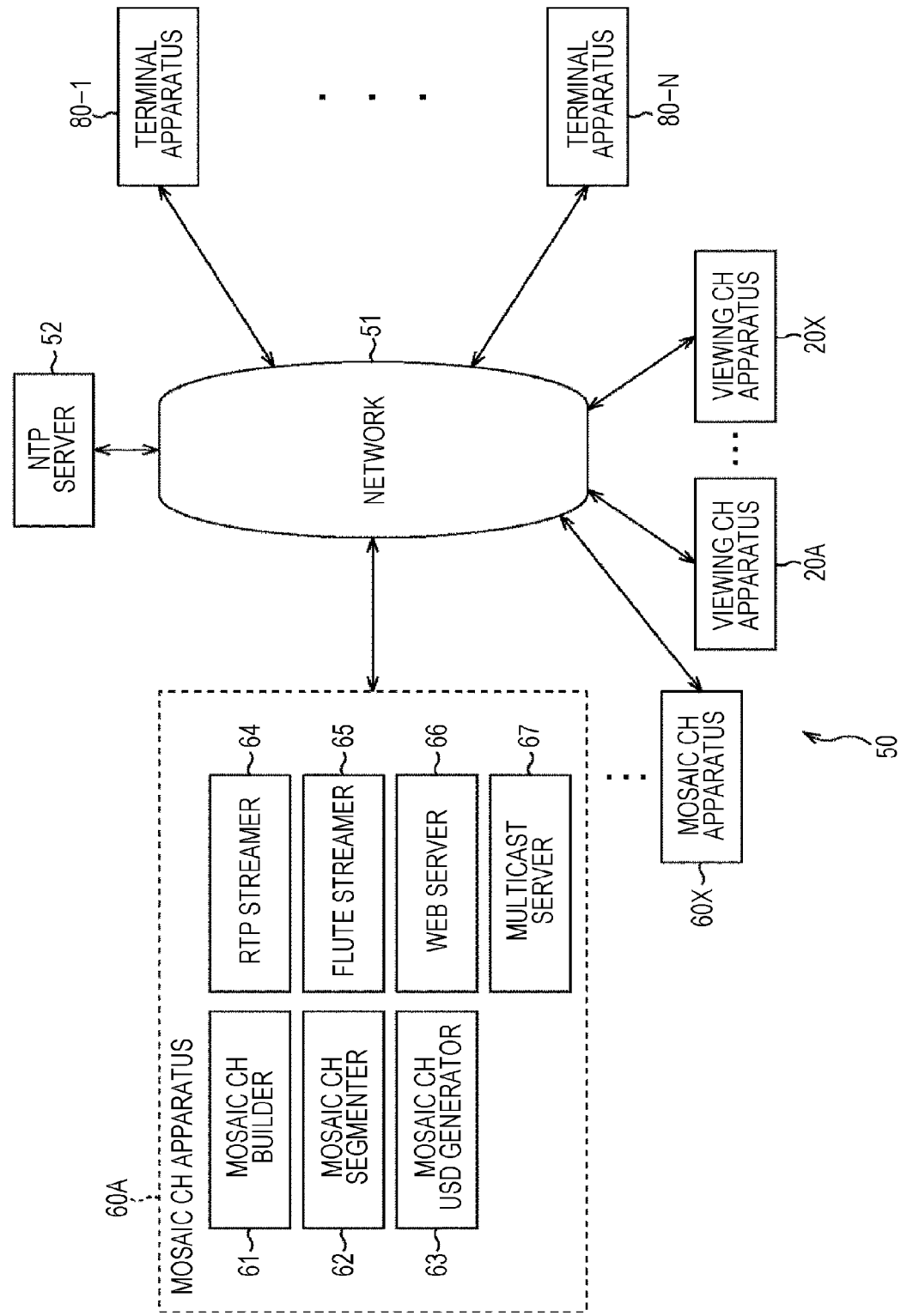
FIG. 6 is a block diagram of an exemplary configuration of a content supply system to which the present disclosure is applied.

FIG. 6 shows an exemplary configuration of a content supply system which is an embodiment of the present disclosure.

This content supply system 50 is composed of a plurality of viewing CH apparatuses 20 that deliver viewing CH streams as viewing channels; a plurality of mosaic CH apparatuses 60 that deliver mosaic CH streams as mosaic channels; and multiple terminal apparatuses 80. Note that a viewing CH apparatus 20 corresponds to a viewing channel A, and a mosaic CH apparatus 60A corresponds to a mosaic channel A. The number of the viewing CH apparatuses 20 and the number of the mosaic CH apparatuses 60 do not need to be the same, and the number of the mosaic CH apparatuses 60 may be smaller than the number of the viewing CH apparatuses 20.

A network 51 includes various types of broadcast networks that use terrestrial broadcast waves, satellite broadcast waves, cellular broadcast (e)MBMS, etc., in addition to bidirectional communication networks represented by the Internet and a CDN using the Internet.

An NTP server 52 that provides system time information conforming to UTC time format is connected to the network 51. The NTP server 52 can supply system time information to each viewing CH apparatus 20, each mosaic CH apparatus 60, each terminal apparatus 80, etc. Note that each viewing CH apparatus 20, each mosaic CH apparatus 60, and each terminal apparatus 80 operate such that their system times are synchronized with an NTP time base, according to the system time information from the NTP server 52.

Figure 1:
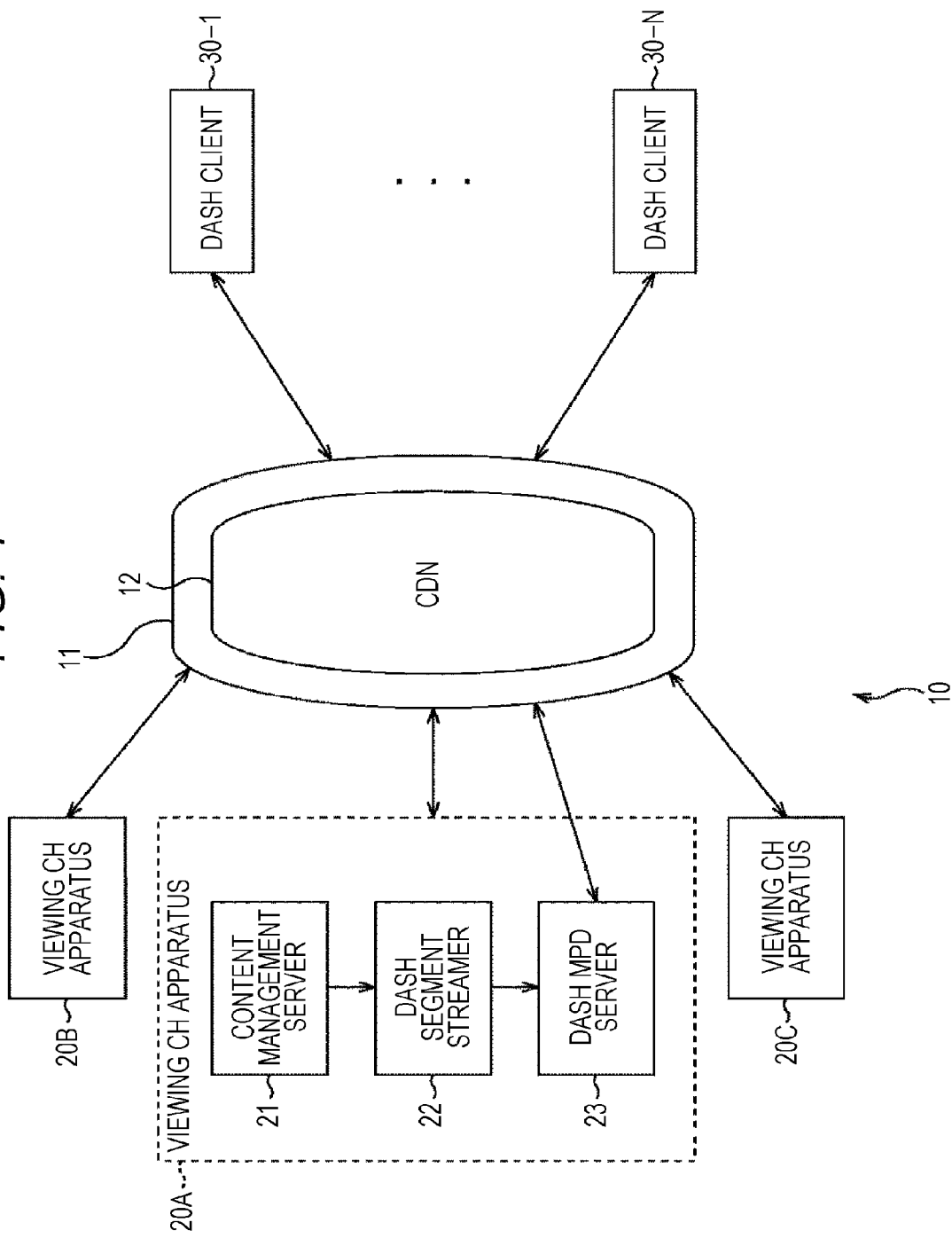
FIG. 1 is a block diagram showing an example of a configuration of a conventional content supply system.
Figure 2:
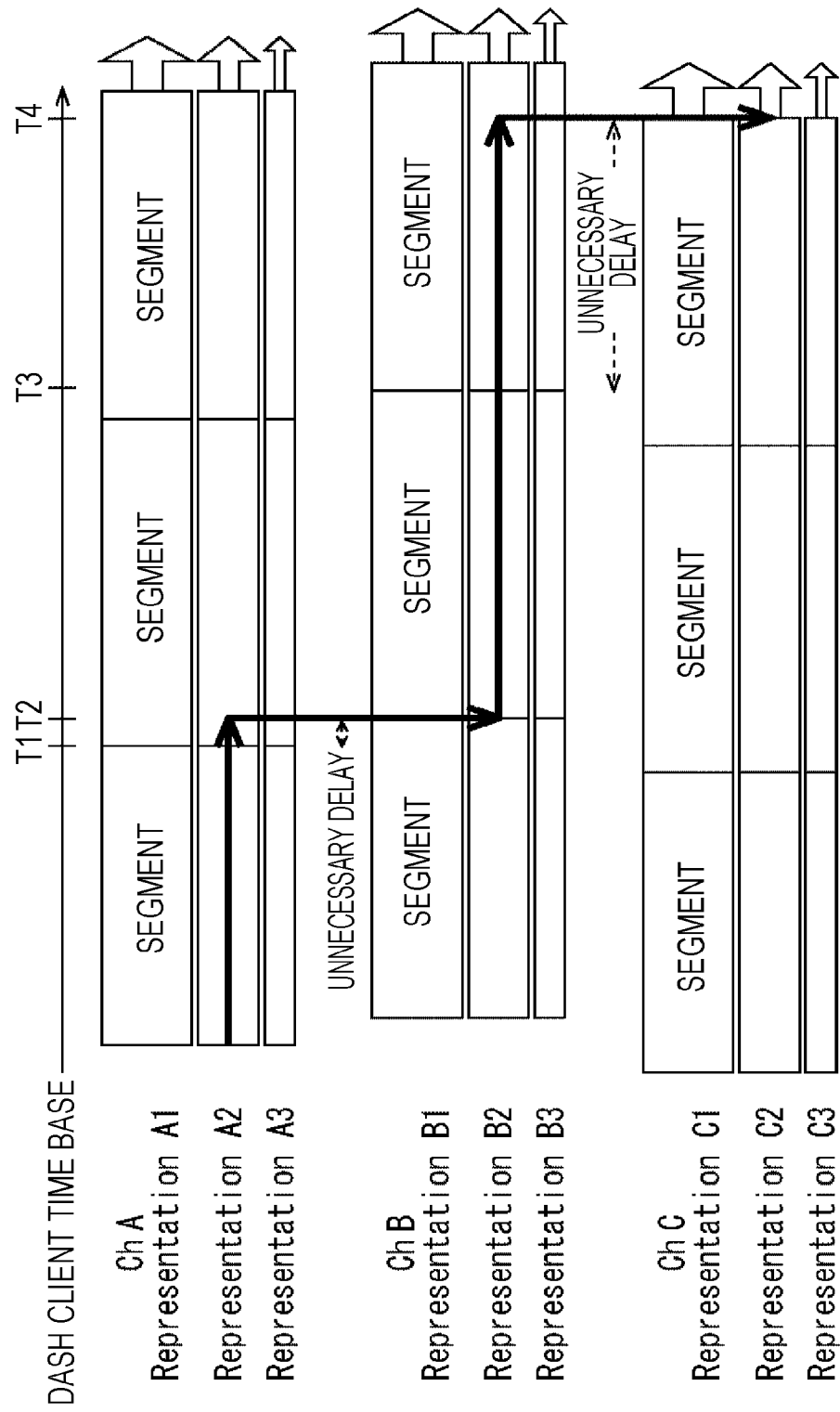
FIG. 2 is a diagram describing delay occurring by switching between channels.
Figure 3:
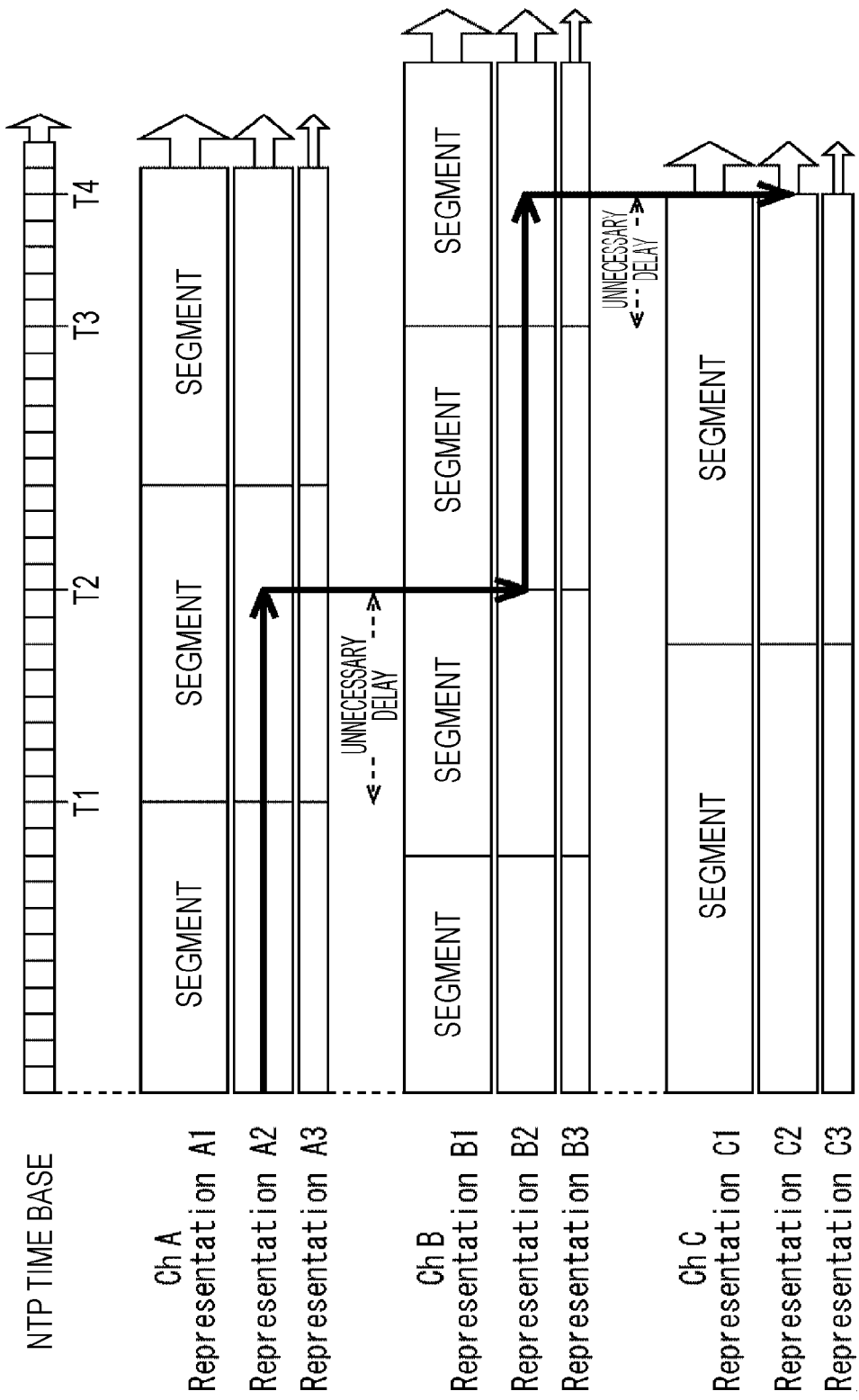
FIG. 3 is a diagram describing delay occurring by switching between channels.

The viewing CH apparatuses 20 are configured in the same manner as those shown in FIG. 1. Note, however, that the viewing CH apparatuses 20 of FIG. 1 supply segment streams and MPDs to a receiver only by HTTP-unicast, but in the content supply system 50 segment streams and MPDs may be supplied not only by HTTP-unicast, but also by FLUTE-multicast and RTP-multicast.

Each mosaic CH apparatus 60 includes a mosaic CH builder 61, a mosaic CH segmenter 62, a mosaic CH USD generator 63, an RTP streamer 64, a FLUTE streamer 65, a WEB server 66, and a multicast server 67.

Note that the mosaic CH builder 61 to the multicast server 67 of the mosaic CH apparatus 60 may be collectively disposed, or may be disposed in a distributed manner through the Internet, etc.

Figure 7:
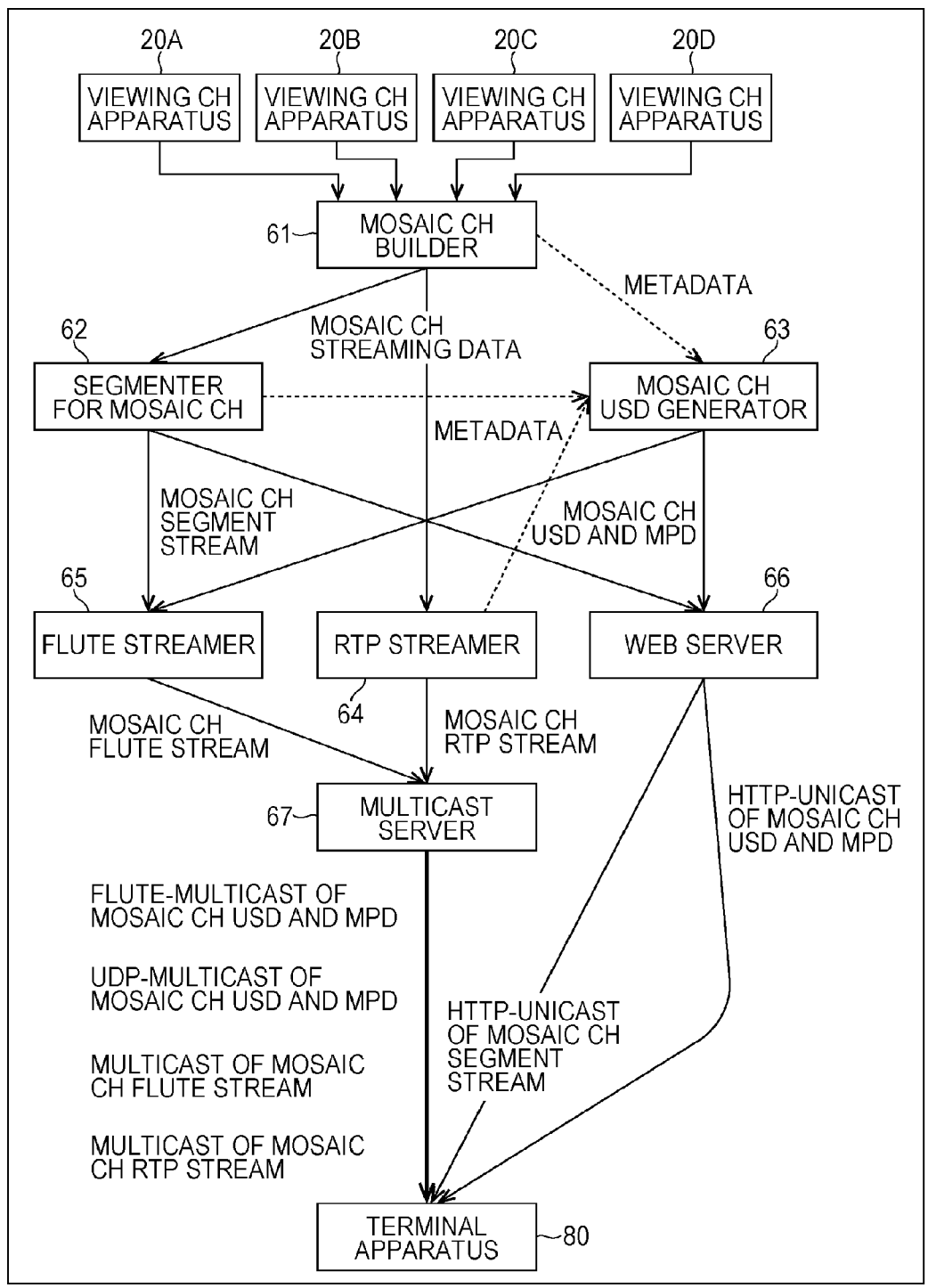
FIG. 7 is a diagram showing the flow of data for when a mosaic channel is viewed.

FIG. 7 shows the flow of various types of data among the mosaic CH builder 61 to the multicast server 67.

The mosaic CH builder 61 obtains streaming data of content which are delivered from a plurality of viewing CH apparatuses 20 (viewing CH apparatuses 20A to 20D in the case of FIG. 7) through their viewing channels. Then, the mosaic CH builder 61 divides a mosaic channel screen into four areas of 2×2, disposes pieces of video of content of viewing channels A to D in the respective areas, combines the pieces of video together, and thereby generates mosaic CH streaming data.

Furthermore, the mosaic CH builder 61 outputs the generated mosaic CH streaming data to the mosaic CH segmenter 62 and the RTP streamer 64. Moreover, the mosaic CH builder 61 supplies metadata about the content which is delivered from each viewing CH apparatus 20 through its viewing channel (a URL of a supply source of a segment stream, etc.) and disposition information of the viewing CH streaming data on the mosaic screen, to the mosaic CH USD generator 63.

The mosaic CH segmenter 62 converts the mosaic CH streaming data into a mosaic CH segment stream such as fragmented MP4, and outputs the mosaic CH segment stream to the FLUTE streamer 65 and the WEB server 66. Note that the segment length of the mosaic CH segment stream is made uniform with that of mosaic CH segment streams which are generated by mosaic CH apparatuses 60 of other mosaic channels, and the limits of segments are synchronized with the NTP time base. Therefore, zapping can be performed between mosaic channels without causing unnecessary delay.

Furthermore, the mosaic CH segmenter 62 notifies the mosaic CH USD generator 63 of metadata of the generated mosaic CH segment stream (a URL of the WEB server 66 serving as a supply source of a file where the mosaic CH segment stream is stored, etc.).

In addition, the mosaic CH USD generator 63 generates a USD for a mosaic CH (hereinafter, also referred to as mosaic CH USD) including a mosaic element that directly describes an extended HTML element describing the disposition information of the viewing CH streaming data on the mosaic screen, etc., or that describes a reference to the extended HTML element, and outputs the mosaic CH USD to the FLUTE streamer 65 and the WEB server 66.

The mosaic CH USD generator 63 generates an MPD for the mosaic CH (hereinafter, also referred to as mosaic CH MPD) which is required for the terminal apparatuses 80 to receive the mosaic CH segment stream and a mosaic CH RTP stream (described later), and outputs the mosaic CH MPD to the FLUTE streamer 65 and the WEB server 66.

The RTP streamer 64 stores, in RTP packets, the mosaic CH streaming data which is inputted from the mosaic CH builder 61, and thereby generates a mosaic CH RTP stream, and outputs the mosaic CH RTP stream to the multicast server 67. In addition, the RTP streamer 64 notifies the mosaic CH USD generator 63 of metadata of the mosaic CH RTP stream.

The FLUTE streamer 65 stores, in FLUTE packets, the mosaic CH segment stream which is inputted from the mosaic CH segmenter 62, and thereby generates a mosaic CH FLUTE stream, and outputs the mosaic CH FLUTE stream to the multicast server 67. In addition, the FLUTE streamer 65 outputs the USD and MPD for the mosaic CH which are inputted from the mosaic CH USD generator 63, to the multicast server 67.

In response to a request from a terminal apparatus 80, the WEB server 66 HTTP-unicasts the mosaic CH USD and the mosaic CH MPD to the request source. In addition, in response to a request from the terminal apparatus 80, the WEB server 66 HTTP-unicasts the mosaic CH USD to the request source. Furthermore, in response to a request from the terminal apparatus 80, the WEB server 66 HTTP-unicasts the mosaic CH segment stream to the request source.

The multicast server 67 FLUTE-multicasts and UDP-multicasts the mosaic CH USD and MPD. In addition, the multicast server 67 FLUTE-multicasts the mosaic CH FLUTE stream. Furthermore, the multicast server 67 RTP-multicasts the mosaic CH RTP stream.

Each terminal apparatus 80 is connected to the viewing CH apparatuses 20 and the mosaic CH apparatuses 60 through the network 51. When the terminal apparatus 80 performs zapping between mosaic channels, the terminal apparatus 80 obtains mosaic CH USDs and MPDs which are multicast, wherever possible, and receives and plays back mosaic CH FLUTE streams or mosaic CH RTP streams which are multicast, wherever possible, based on the obtained mosaic CH USDs and MPDs.

If this cannot be performed, mosaic CH USDs and MPDs which are HTTP-unicast are obtained, and mosaic CH FLUTE streams or mosaic CH RTP streams which are multicast are received and played back. If this cannot be performed, either, mosaic CH segment streams which are HTTP-unicast are received and played back, using mosaic CH USDs and MPDs which are HTTP-unicast.

When the terminal apparatus 80 receives a mosaic CH segment stream or a mosaic CH RTP stream, a mosaic CH USD is referred to. When the terminal apparatus 80 receives a mosaic CH FLUTE stream, announcement information that describes a portal channel of the multicast server 67 that performs FLUTE-multicast is referred to.

For the announcement information, for example, a USD is used. Note that under present circumstances the USD is FLUTE-multicast only by cellular broadcast (e)MBMS included in the network 51, but the USD may be FLUTE-multicast in other broadcast networks included in the network 51, too.

Figure 8:
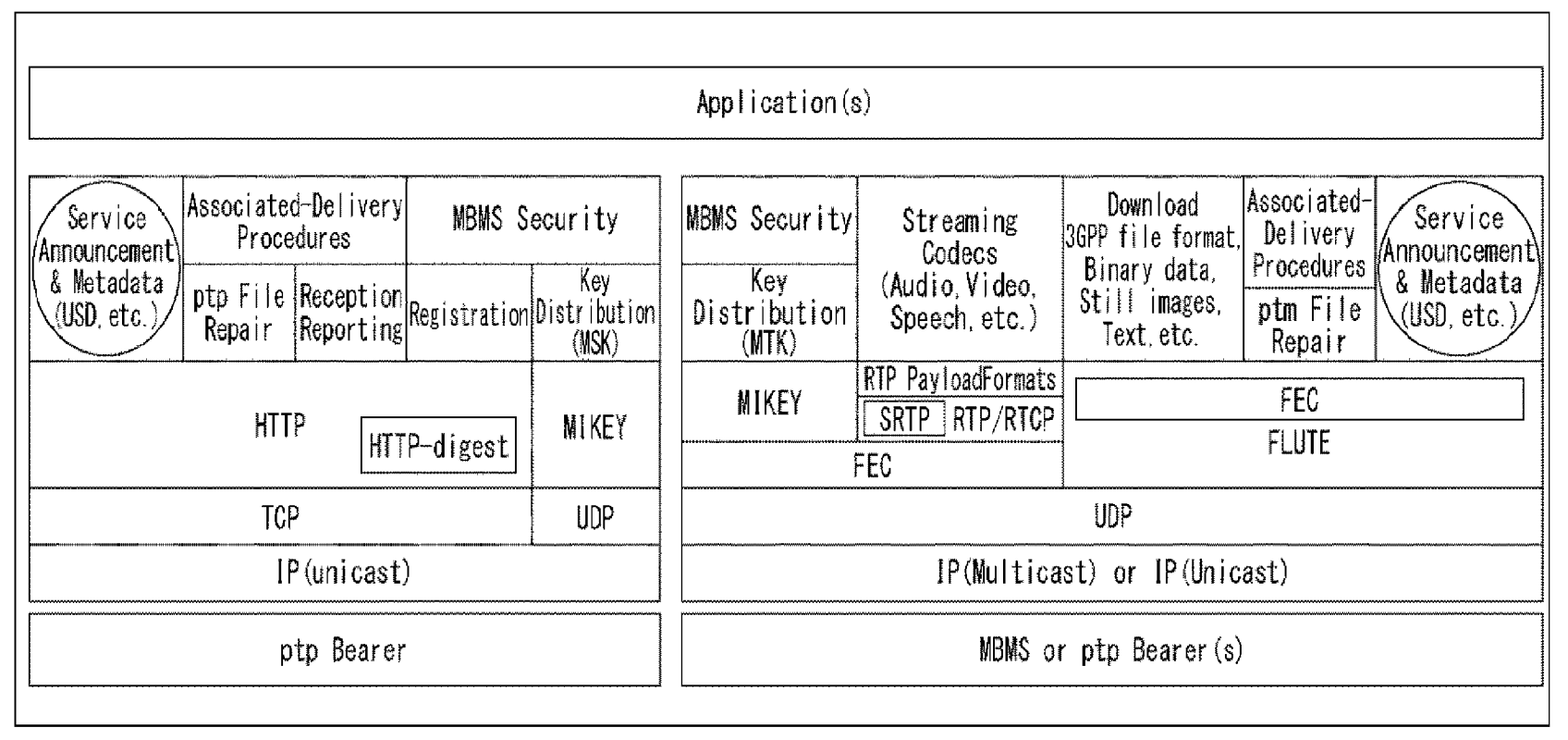

FIG. 8 shows the disposition of a USD in MBMS. The USD is delivered stored in Service Announcement &Metadata of MBMS. The Service Announcement & Metadata is disposed in an interaction channel and a broadcast/multicast channel of MBMS. Therefore, the USD is FLUTE-multicast through the broadcast/multicast channel. In addition, the USD can be HTTP-unicast through the interaction channel.

[For a Relationship Between a Mosaic CH USD and MPD]

There are two types of mosaic CH USD: an extended-HTML inclusion type mosaic CH USD and an extended-HTML reference type mosaic CH USD.

Figure 9:
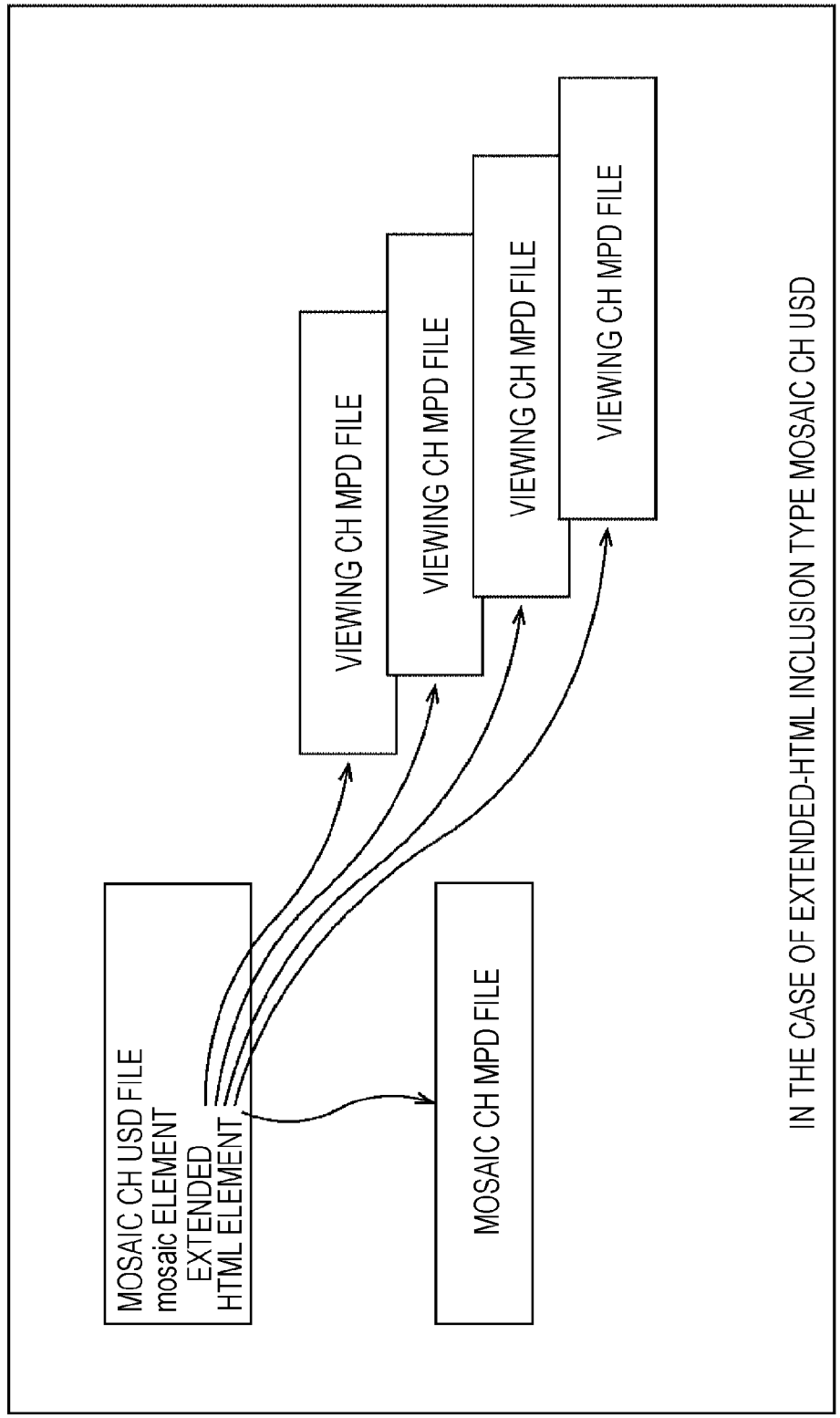
FIG. 9 is a diagram showing a relationship between an extended-HTML inclusion type mosaic CH USD and an MPD.

FIG. 9 shows a relationship between a mosaic CH USD and MPD for when the mosaic CH USD is an extended-HTML inclusion type mosaic CH USD.

A mosaic element is introduced in the extended-HTML inclusion type mosaic CH USD, and an extended HTML element is directly described in the mosaic element.

In the extended HTML element, in a div element of HTML, a reference to a control target element is specified by an xlink:type attribute (the value "simple") and an xlink:href attribute so that a reference attribute to an Adaptation Set element, a Representation element, or a SubRepresentation element in a mosaic CH MPD which is a control description target can be specified. An address of a viewing stream to which switching is performed when a channel corresponding to an area specified by this div element is confirmed and selected is indicated. In addition, when a reference to a control target element is specified by an xlink: actuate attribute (the value "onLoad"), an xlink:type attribute (the value "simple"), and an xlink:href attribute, an address of a stream to which switching is performed when a focus is moved to an area specified by this div element (simple pointer movement which is different from the above-described channel selection and confirmation operation) is indicated.

Figure 10:
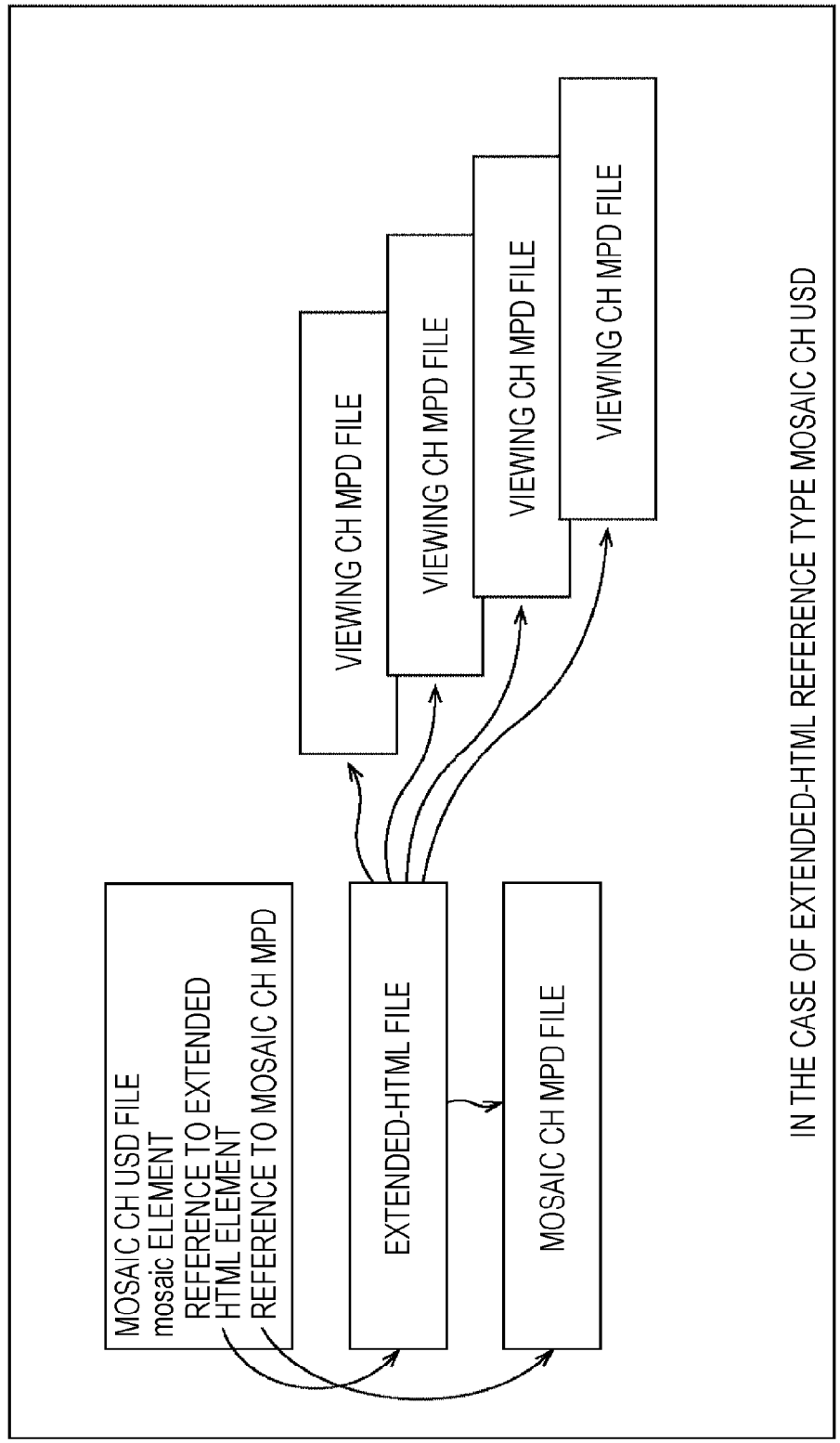
FIG. 10 is a diagram showing a relationship between an extended-HTML reference type mosaic CH USD and an MPD.

FIG. 10 shows a relationship between a mosaic CH USD and MPD for when the mosaic CH USD is an extended-HTML reference type mosaic CH USD.

A mosaic element is introduced in the extended-HTML reference type mosaic CH USD, and a reference to an extended HTML element and a reference to a mosaic CH MPD are described in the mosaic element.

Note that instead of using the extended HTML element, Synchronized Multimedia Integration Language (SMIL) may be used.

FIG. 11 shows an example of the extended-HTML inclusion type mosaic CH USD.

As shown in the drawing, a mosaic element being present in an USD indicates that the USD is a mosaic CH USD. A div element in an extended HTML element describes information about an area provided on a mosaic CH stream screen.

A body element describes a reference to an audio stream of a viewing CH that is outputted when a focus is moved to each area; and a reference to a video stream and an audio stream of the viewing CH that are received and played back when each area is selected.

In the case of the drawing, a reference to an audio stream that is outputted when a focus is moved to each area is in a mosaic CH MPD where the MPDURI is http://example-.com/c.mpd. For references to a video stream and an audio stream for viewing that are received and played back when each area is selected, viewing MPDs which are different than the mosaic CH MPD are specified. Note, however, that references to a video stream and an audio stream for viewing that are received and played back when each area is selected are not limited to viewing MPDs.

FIG. 12 shows an example of a mosaic CH MPD. In the case of this drawing, an AdaptationSet element related to video stores the identifier of a Representation of a video stream of a mosaic CH. An AdaptationSet element related to audio stores the identifiers of RepresentationSet of audio streams of viewing CHs that are outputted when a focus is moved to the respective areas.

FIG. 13 shows an example of the extended-HTML reference type mosaic CH USD. FIG. 14 shows an example of a file of an extended HTML element which is present as a different file than the extended-HTML reference type mosaic CH USD and which is referred to from the extended-HTML reference type mosaic CH USD.

A mosaic element in the extended-HTML reference type mosaic CH USD describes a reference to an extended HTML element which is present as a different file, and a reference to a mosaic CH MPD. The extended HTML element of FIG. 14 describes the same content as that of the extended HTML element shown in FIG. 11.

FIG. 15 specifically shows the content of the extended HTML element shown in FIG. 11 or 14. Specifically, in the extended HTML element, in div elements, the entire screen with 1920 pixels×1080 pixels is defined as Base, and an upper left area of the screen is defined as C1 area, an upper right area as C2 area, a lower left area as C3 area, and a lower right area as C4 area.

When the entire screen, i.e., Base, is displayed, the extended HTML element describes that Id-C1a as an audio stream for the C1 area, Id-C2a as an audio stream for the C2 area, Id-C3a as an audio stream for the C3 area, and Id-C4a as an audio stream for the C4 area are simultaneously outputted.

Note, however, that instead of the terminal apparatus 80 simultaneously outputting audio corresponding to the four audio streams, the terminal apparatus 80 outputs, by a function of a browser, etc., only Id-C1a when the C1 area is being focused, outputs only Id-C2a when the C2 area is being focused, outputs only Id-C3a when the C3 area is being focused, and outputs only Id-C4a when the C4 area is being focused.

Furthermore, when the C1 area is selected, a viewing video stream specified by http://a.com/C1mpd.mpd#1d-v and a viewing audio stream specified by http://a.com/C1mpd.mpd#1d-a are received and played back. When the C2 area is selected, a viewing video stream specified by http://a.com/C2mpd.mpd#1d-v and a viewing audio stream specified by http://a.com/C2mpd.mpd#1d-a are received and played back. When the C3 area is selected, a viewing video stream specified by http://a.com/C3mpd.mpd#1d-v and a viewing audio stream specified by http://a.com/C3mpd.mpd#1d-a are received and played back. When the C4 area is selected, a viewing video stream specified by http://a.com/C4mpd.mpd#1d-v and a viewing audio stream specified by http://a.com/C4mpd.mpd#1d-a are received and played back.

Next, a method of adding an attribute indicating that a corresponding mosaic CH stream is zappable, by further extending the above-described extended-HTML inclusion type mosaic CH USD and extended-HTML reference type mosaic CH USD will be described.

FIG. 16 shows an example of a USD added with an attribute indicating that a corresponding mosaic CH stream is zappable.

Specifically, in a specified r7:serviceClass attribute which is an attribute of bundleDescription, the class name "urn:streamType:forZapping" is defined and introduced as a flag attribute indicating that a stream can be used for zapping. When this is described, it indicates that a stream described in this USD is such that the segment length is sufficiently small or the cycle of switchable boundaries (e.g., I-pictures) is sufficiently small and the switchable boundaries are signaled, and thus, the stream is zappable.

Alternatively, immediately under bundleDescription, an NTPSynchronized attribute (boolean type, true/false) and a SegmentAligned attribute (boolean type, true/false) are introduced. bundleDescription/@NTPSynchronized indicates that the limits of segments of a stream are synchronized with the NTP time base. bundleDescription/@SegmentAligned indicates that the segments of the stream have a uniform segment length. Therefore, if bundleDescription/@NTPSynchronized and bundleDescription/@SegmentAligned are true, then it means that the stream can be switched without causing unnecessary delay.

Note that although in the example of FIG. 16, as flag attributes, the class name "urn:streamType:forZapping" and bundleDescription/@NTPSynchronized and bundleDescription/@SegmentAligned are described, either one may be described to indicate that a corresponding stream is zappable. Of course, both may be described.

On the other hand, in the mosaic CH MPD, in a group to which a channel of the content supply apparatus 60 belongs, the starting points of media playback times at the beginning of segments (MPD/@availabilityStartTime+Period/@start) are allowed to match on the NTP time base.

Furthermore, in the mosaic CH MPD, it is essential to describe at least one of a segmentBase/@duration attribute that stores a value indicating segment length, and an MPD/@maxSegmentDuration attribute that stores a value indicating maximum segment length.

Furthermore, in order that seamless switching can be performed between a mosaic CH segment stream which is HTTP-unicast and a mosaic CH RTP stream which is RTP-multicast, a Service Location element attribute is newly introduced in the mosaic CH MPD. In addition, an rtspRange attribute is introduced that indicates a section of a mosaic CH RTP stream to be sent by multicast, which corresponds to a byte range of a segment to be sent by HTTP-unicast.

The rtspRange attribute is to identify a section of a mosaic CH RTP stream to be multicast, which is a switching target of a mosaic CH segment stream to be HTTP-unicast, and is disposed in a Segment URL element. The rtspRange attribute stores a character string of a format (UTC format) of a range parameter identifying an RTP stream section, which is defined in Real Time Streaming Protocol (RTSP) used to control RTP streaming, which is defined in Request For Comment (RFC) 2326. Note that the format of information stored in the rtspRange attribute is not limited to UTC format.

Furthermore, a ServiceLocationAttributeUrl attribute that describes a url of a ServiceLocationAttribute file that stores the ServiceLocation element as a root element is disposed in BaseURL of the MPD.

The ServiceLocation element includes a tuning parameter (DeliverySystemAttributes) and an IP multicast address (IPMulticastAddress).

DeliverySystemIdentifier of DeliverySystemAttributes describes, for example, when a multicast bearer or a broadcast bearer of a mobile network such as MBMS is used, a format identifier (ID_MBMS in the case of MBMS) of a data structure of a tuning parameter adopted in multicast transmission or broadcast transmission by MBMS, etc.

In addition, for example, when a broadcast bearer of an existing television broadcast network such as a DVB terrestrial network is used, a format identifier (ID_DVB_T in the case of a DVB terrestrial network) of a data structure of a tuning parameter adopted in broadcast transmission in the DVB terrestrial network is described.

DeliverySystemDescriptor of DeliverySystemAttributes describes a data structure (parameter itself) of a tuning parameter corresponding to a delivery mode which is identified by DeliverySystemIdentifier.

[Operation of the Content Supply System 50]

Next, the operation of the content supply system 50 will be described.

Figure 17:
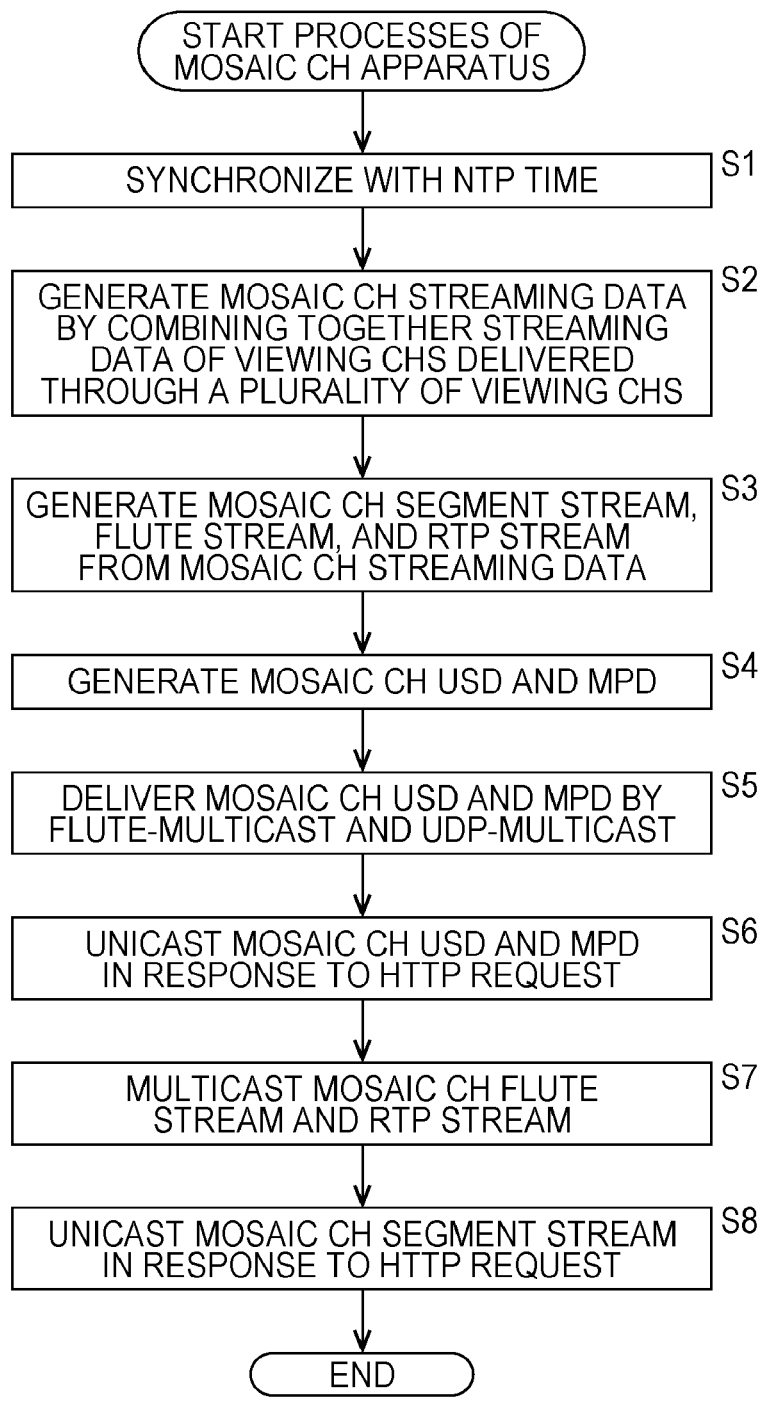
FIG. 17 is a flowchart describing a series of processes of the content supply system.

FIG. 17 is a flowchart describing processes performed by each mosaic CH apparatus 60 to deliver a mosaic CH stream.

At step S1, the mosaic CH apparatus 60 allows its system time to be synchronized with an NTP time base, according to system time information provided from the NTP server 52. By this, the mosaic CH segmenter 62, etc., of the mosaic CH apparatus 60 can operate in synchronization with the NTP time base.

At step S2, the mosaic CH builder 61 obtains streaming data of content (or source data thereof) delivered from a plurality of (four in the present embodiment) viewing CH apparatuses 20, respectively, as viewing channels, disposes the streaming data in a plurality of areas of a screen, combines the streaming data together, and thereby generates mosaic CH streaming data. Furthermore, the mosaic CH builder 61 outputs the generated mosaic CH streaming data to the mosaic CH segmenter 62 and the RTP streamer 64. Moreover, the mosaic CH builder 61 obtains metadata of the content delivered from the plurality of viewing CH apparatuses 20 through the viewing channels, and supplies the metadata together with disposition information of the viewing CH content in the mosaic CH streaming data to the mosaic CH USD generator 63.

At step S3, the mosaic CH segmenter 62 generates a mosaic CH segment stream such as fragmented MP4 from the mosaic CH streaming data inputted from the mosaic CH builder 61, and outputs the mosaic CH segment stream to the FLUTE streamer 65 and the WEB server 66. In addition, the mosaic CH segmenter 62 notifies the mosaic CH USD generator 63 of metadata of the generated mosaic CH segment stream.

The FLUTE streamer 65 stores, in FLUTE packets, the mosaic CH segment stream inputted from the mosaic CH segmenter 62, and thereby generates a mosaic CH FLUTE stream, and outputs the mosaic CH FLUTE stream to the multicast server 67.

The RTP streamer 64 stores, in RTP packets, the mosaic CH streaming data inputted from the mosaic CH builder 61, and thereby generates a mosaic CH RTP stream, and outputs the mosaic CH RTP stream to the multicast server 67. In addition, the RTP streamer 64 notifies the mosaic CH USD generator 63 of metadata of the mosaic CH RTP stream.

At step S4, the mosaic CH USD generator 63 generates a mosaic CH USD and MPD based on the notified disposition information and metadata, and outputs the mosaic CH USD and MPD to the FLUTE streamer 65 and the WEB server 66.

At step S5, the FLUTE streamer 65 outputs the mosaic CH USD and MPD which are inputted from the mosaic CH USD generator 63, to the multicast server 67. The multicast server 67 FLUTE-multicasts and UDP-multicasts (including overlay multicast, etc.) the mosaic CH USD and MPD.

At step S6, when there is an HTTP request from a terminal apparatus 80 to request a mosaic CH USD and MPD, the WEB server 66 HTTP-unicasts the mosaic CH USD and MPD to the request source in response to the HTTP request.

At step S7, the multicast server 67 FLUTE-multicasts the mosaic CH FLUTE stream and RTP-multicasts the mosaic CH RTP stream.

At step S8, when there is an HTTP request from the terminal apparatus 80 to request a file of a mosaic CH segment stream, the WEB server 66 HTTP-unicasts the file of a mosaic CH segment stream to the request source in response to the HTTP request. Description of the processes performed by the mosaic CH apparatus 60 ends here.

Next, a series of processes of the content supply system 50 up to when a terminal apparatus 80 transitions to a viewing phase where the terminal apparatus 80 receives and plays back a viewing CH after going through a zapping phase where the terminal apparatus 80 switches between a plurality of mosaic CHs (hereinafter, referred to as a series of processes) will be described with reference to FIGS. 18 to 20.

Figure 18:
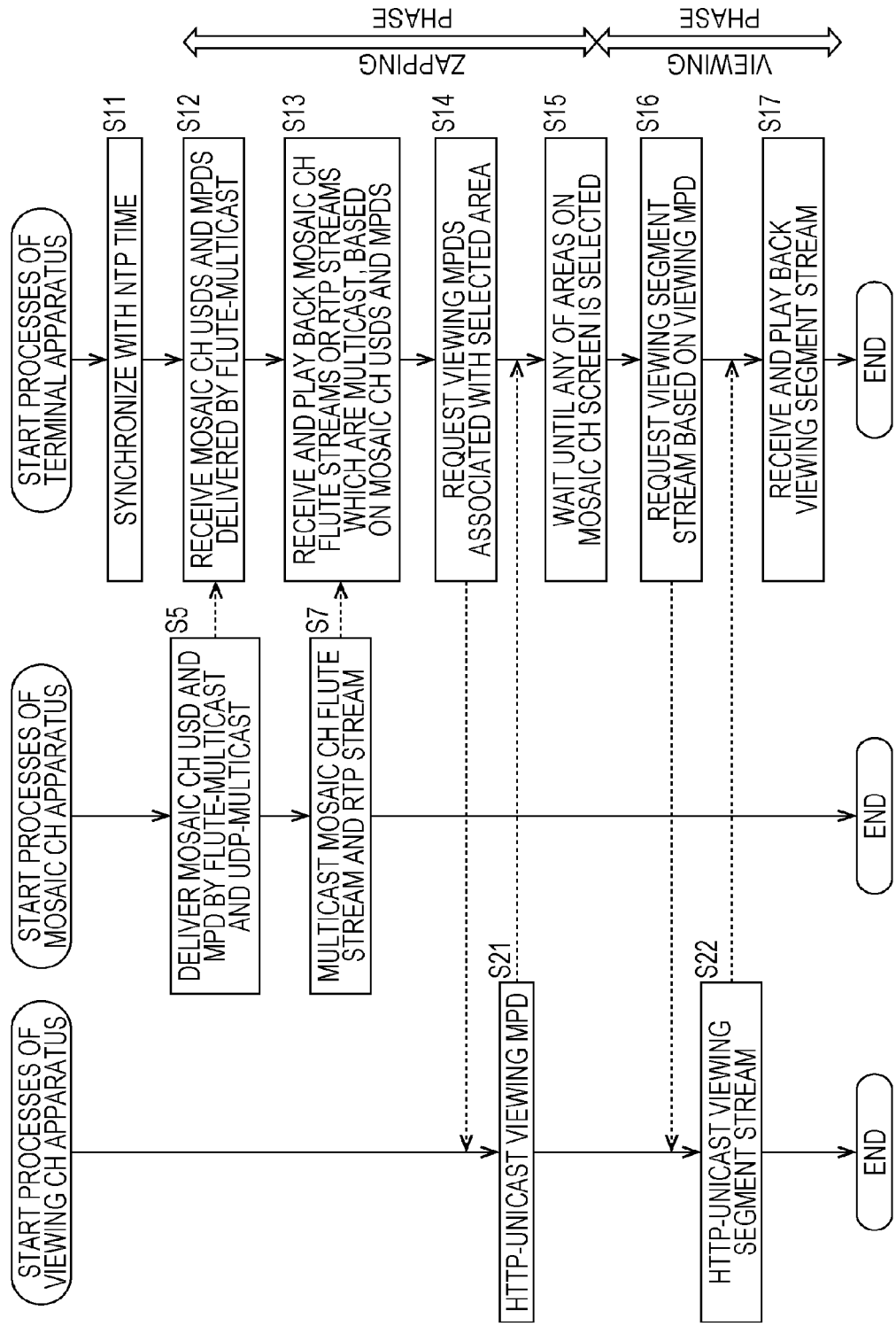
FIG. 18 is a flowchart describing a series of processes of the content supply system.

FIG. 18 is a flowchart for when the terminal apparatus 80 can receive mosaic CH USDs and MPDs which are multicast, and can receive and play back mosaic CH FLUTE streams or mosaic CH RTP streams which are multicast.

Note that a method of receiving viewing MPDs and viewing streams which are delivered from the viewing CH apparatuses 20 is any. Note, however, that since in many cases a viewing stream to be HTTP-unicast normally has higher image quality (higher bit rate) than a viewing stream to be multicast, a viewing stream to be HTTP-unicast is received wherever possible.

At step S11, the terminal apparatus 80 allows its system time to be synchronized with the NTP time base, according to system time information provided from the NTP server 52. At step S12, the terminal apparatus 80 receives mosaic CH USDs and MPDs which are FLUTE-multicast in the process at step S5 of FIG. 17. The terminal apparatus 80 having received the mosaic CH USDs and MPDs goes into a zapping phase.

At step S13, based on the mosaic CH USDs and MPDs, the terminal apparatus 80 receives and plays back mosaic CH FLUTE streams which are FLUTE-multicast or mosaic CH RTP streams which are RTP multicast in the process at step S7 of FIG. 17.

During the zapping phase, the terminal apparatus 80 can perform quick zapping between mosaic channels, by repeating the process at step S13 as appropriate.

Note that the terminal apparatus 80 obtains, during the zapping phase, viewing MPDs of a plurality of viewing channels that form a mosaic channel being received and played back. Specifically, at step S14, the terminal apparatus 80 requests viewing CH apparatuses 20 for viewing MPDs, the viewing CH apparatuses 20 corresponding to a plurality of viewing channels, respectively, that form a mosaic channel being received and played back. The terminal apparatus 80 receives viewing MPDs which are HTTP-unicast in response to the request in a process at step S21.

Furthermore, during the zapping phase, at step S15, the terminal apparatus 80 waits until any of the areas on a mosaic channel screen is selected. Then, when any of the areas on the mosaic channel screen is selected, the terminal apparatus 80 transitions to a viewing phase.

At step S16, the terminal apparatus 80 having transitioned to the viewing phase requests a corresponding viewing CH apparatus 20 for a viewing segment stream, based on a viewing MPD associated with the selected area which is included in the mosaic CH USD or which is obtained by analyzing an extended HTML element being referred to. At step S17, the terminal apparatus 80 receives and plays back a viewing segment stream which is HTTP-unicast in response to the request in a process at step S22.

Thereafter, the terminal apparatus 80 can also return to a zapping phase from the viewing phase and then again transition to a viewing phase. Description of the series of processes ends here. According to the above-described series of processes, quick zapping can be performed between mosaic channels, and a quick transition from a mosaic channel screen to a viewing channel can be performed.

Figure 19:
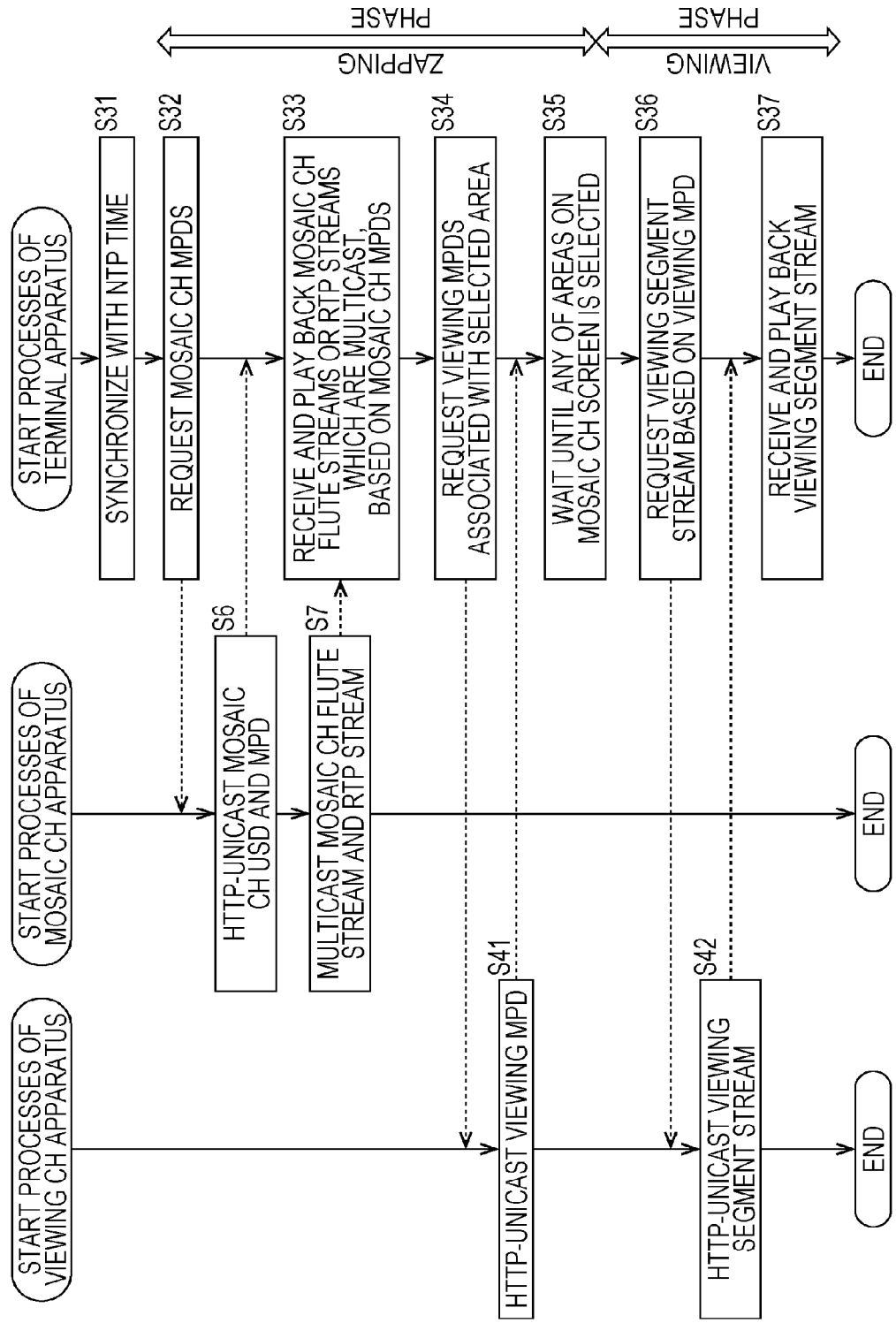
FIG. 19 is a flowchart describing a series of processes of the content supply system.

Next, FIG. 19 is a flowchart for when the terminal apparatus 80 obtains mosaic CH USDs and MPDs which are HTTP-unicast and can receive and play back mosaic CH FLUTE streams or mosaic CH RTP streams which are multicast.

Note that a method of receiving viewing MPDs and viewing streams is any as with the above-described case of FIG. 18.

At step S31, the terminal apparatus 80 allows its system time to be synchronized with the NTP time base, according to system time information provided from the NTP server 52. At step S32, the terminal apparatus 80 requests the WEB server 66 of each mosaic CH apparatus 60 for a mosaic CH USD and MPD. In response to this request, the WEB servers 66 HTTP-unicast mosaic CH USDs and MPDs to an MPD obtaining portal 70 in the process at step S6 of FIG. 17. The mosaic CH USDs and MPDs are sent to the terminal apparatus 80 which is the request source.

The terminal apparatus 80 having received the mosaic CH USDs and MPDs goes into a zapping phase. At step S33, based on the mosaic CH USDs and MPDs, the terminal apparatus 80 receives and plays back mosaic CH FLUTE streams which are FLUTE-multicast or mosaic CH RTP streams which are RTP-multicast in the process at step S7 of FIG. 17.

During the zapping phase, the terminal apparatus 80 can perform quick zapping between mosaic channels, by repeating the process at step S33 as appropriate.

Note that the terminal apparatus 80 obtains, during the zapping phase, viewing MPDs of a plurality of viewing channels that form a mosaic channel being received and played back. Specifically, at step S34, the terminal apparatus 80 requests viewing CH apparatuses 20 for viewing MPDs, the viewing CH apparatuses 20 corresponding to a plurality of viewing channels, respectively, that form a mosaic channel being received and played back. The terminal apparatus 80 receives viewing MPDs which are HTTP-unicast in response to the request in a process at step S41.

Furthermore, during the zapping phase, at step S35, the terminal apparatus 80 waits until any of the areas on a mosaic channel screen is selected. Then, when any of the areas on the mosaic channel screen is selected, the terminal apparatus 80 transitions to a viewing phase.

At step S36, the terminal apparatus 80 having transitioned to the viewing phase requests a corresponding viewing CH apparatus 20 for a viewing segment stream, based on a viewing MPD associated with the selected area which is included in the mosaic CH USD or which is obtained by analyzing an extended HTML element to be referred to. At step S37, the terminal apparatus 80 receives and plays back a viewing segment stream which is HTTP-unicast in response to the request in a process at step S42.

Thereafter, the terminal apparatus 80 can also return to a zapping phase from the viewing phase and then again transition to a viewing phase. Description of the series of processes ends here. According to the above-described series of processes, quick zapping can be performed between mosaic channels, and a quick transition from a mosaic channel screen to a viewing channel can be performed.

Figure 20:
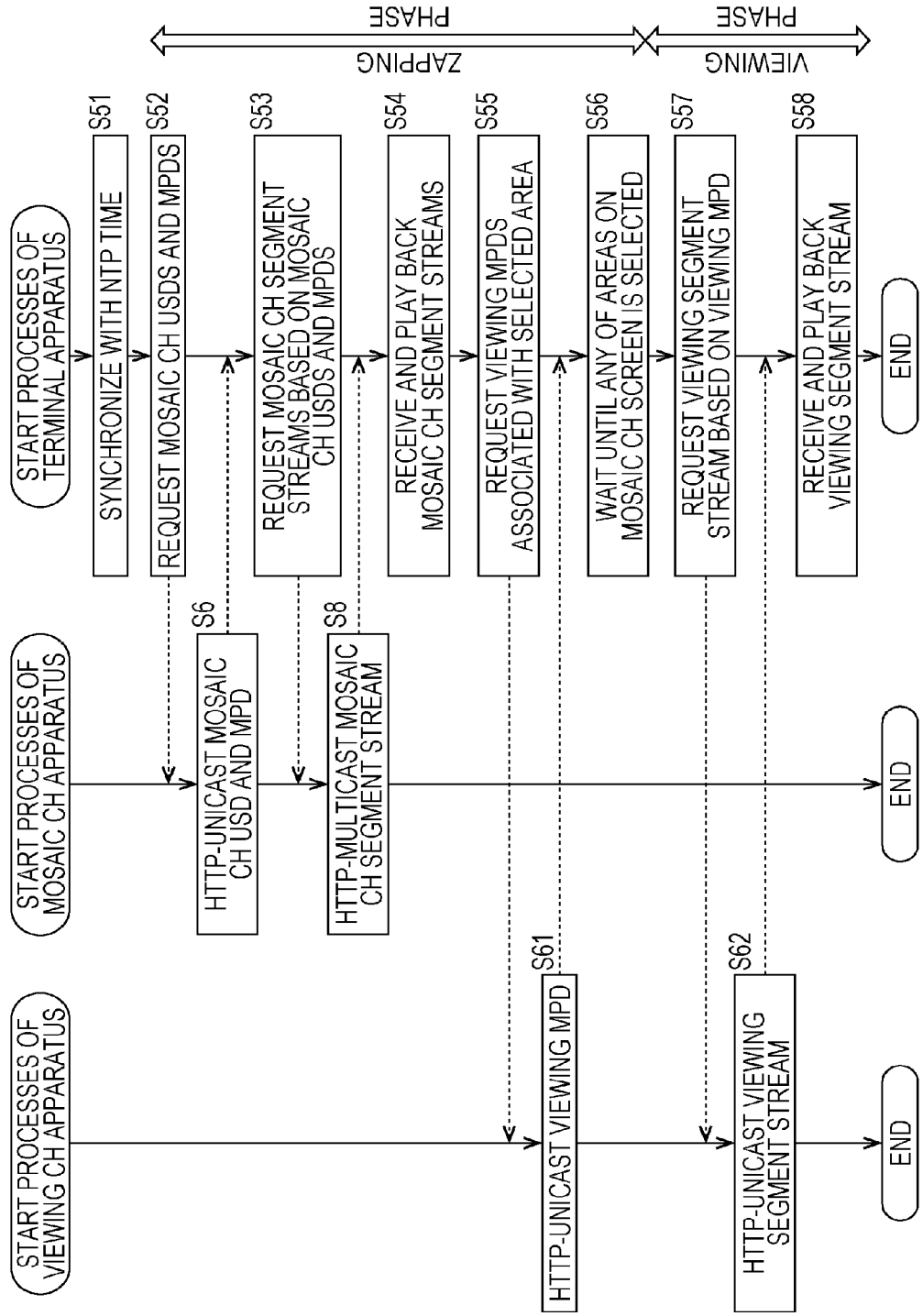
FIG. 20 is a flowchart describing a series of processes of the content supply system.

Next, FIG. 20 is a flowchart for when the terminal apparatus 80 obtains mosaic CH USDs and MPDs which are HTTP-unicast, and cannot receive mosaic CH FLUTE streams and mosaic CH RTP streams which are multicast, but can receive and play back mosaic CH segment streams which are HTTP-unicast.

Note that a method of receiving viewing MPDs and viewing streams is any as with the above-described case of FIG. 18.

At step S51, the terminal apparatus 80 allows its system time to be synchronized with the NTP time base, according to system time information provided from the NTP server 52. At step S52, the terminal apparatus 80 requests the WEB server 66 of each mosaic CH apparatus 60 for a mosaic CH USD and MPD. In response to this request, the WEB servers 66 HTTP-unicast mosaic CH USDs and MPDs to the MPD obtaining portal 70 in the process at step S6 of FIG. 17. The mosaic CH USDs and MPDs are sent to the terminal apparatus 80 which is the request source. The terminal apparatus 80 having received the mosaic CH USDs and MPDs goes into a zapping phase.

At step S53, based on the mosaic CH USDs and MPDs, the terminal apparatus 80 requests the WEB servers 66 for mosaic CH segment streams. In response to this request, the WEB servers 66 HTTP-unicast mosaic CH segment streams to the terminal apparatus 80 in the process at step S8 of FIG. 17.

At step S54, the terminal apparatus 80 receives and plays back the mosaic CH segment streams having been HTTP-unicast.

During the zapping phase, the terminal apparatus 80 can perform quick zapping between mosaic channels, by repeating the process at step S53 as appropriate.

Note that the terminal apparatus 80 obtains, during the zapping phase, viewing MPDs of a plurality of viewing channels that form a mosaic channel being received and played back. Specifically, at step S55, the terminal apparatus 80 requests viewing CH apparatuses 20 for viewing MPDs, the viewing CH apparatuses 20 corresponding to a plurality of viewing channels, respectively, that form a mosaic channel being received and played back. The terminal apparatus 80 receives viewing MPDs which are HTTP-unicast in response to the request in a process at step S61.

Furthermore, during the zapping phase, at step S56, the terminal apparatus 80 waits until any of the areas on a mosaic channel screen is selected. Then, when any of the areas on the mosaic channel screen is selected, the terminal apparatus 80 transitions to a viewing phase.

At step S57, the terminal apparatus 80 having transitioned to the viewing phase requests a corresponding viewing CH apparatus 20 for a viewing segment stream, based on a viewing MPD associated with the selected area which is included in the mosaic CH USD or which is obtained by analyzing an extended HTML element to be referred to. At step S58, the terminal apparatus 80 receives and plays back a viewing segment stream which is HTTP-unicast in response to the request in a process at step S62.

Thereafter, the terminal apparatus 80 can also return to a zapping phase from the viewing phase and then again transition to a viewing phase. Description of the series of processes ends here. According to the above-described series of processes, quick zapping can be performed between mosaic channels, and a quick transition from a mosaic channel screen to a viewing channel can be performed.

Note that although in the above description switching between channels in DASH is performed on a segment-by-segment basis, the switching may be performed on a sub-segment-by-subsegment basis, the subsegment being obtained by further fragmenting the segment. In that case, it is essential for a mosaic CH MPD and a viewing MPD to describe an MPD/@SubSegmentDuration attribute that stores a value indicating subsegment length, and the "segment" in the above-described description is read as "subsegment".

In addition, although in the present embodiment, as information required for the terminal apparatus 80 to receive a mosaic channel, a mosaic CH MPD which is an extended version of a conventional MPD is used, an HTML file can be used instead of the mosaic CH MPD.

Meanwhile, the mosaic CH apparatuses 60 and the terminal apparatuses 80 that perform the above-described series of processes each can not only be configured by hardware, but also implemented by a computer executing software. The computer includes, for example, a computer that is incorporated in dedicated hardware and a general-purpose personal computer, for example, that can perform various types of functions by installing various types of programs.

FIG. 21 is a block diagram showing an exemplary hardware configuration of the above-described computer.

In this computer 100, a Central Processing Unit (CPU) 101, a Read Only Memory (ROM) 102, and a Random Access Memory (RAM) 103 are connected to each other through a bus 104.

An input/output interface 105 is further connected to the bus 104. An input unit 106, an output unit 107, a storage unit 108, a communication unit 109, and a drive 110 are connected to the input/output interface 105.

The input unit 106 is composed of a keyboard, a mouse, a microphone, etc. The output unit 107 is composed of a display, a speaker, etc. The storage unit 108 is composed of a hard disk, a nonvolatile memory, etc. The communication unit 109 is composed of a network interface, etc. The drive 110 drives a removable medium 111 such as a magnetic disk, an optical disk, a magneto-optical disk, or a semiconductor memory.

In the computer 100 configured in the above-described manner, the above-described series of processes are performed by the CPU 101, for example, loading and executing a program stored in the storage unit 108, in the RAM 103 through the input/output interface 105 and the bus 104.

The program executed by the computer 100 (CPU 101) can be provided by, for example, being recorded in the removable medium 111 serving as a package medium, etc. In addition, the program can be provided through a wired or wireless transmission medium such as a local area network, the Internet, or digital satellite broadcasting.

In the computer 100, the program can be installed on the storage unit 108 through the input/output interface 105 by placing the removable medium 111 into the drive 110. In addition, the program can be installed on the storage unit 108 by the communication unit 109 receiving the program through a wired or wireless transmission medium. In addition to the above, the program can be pre-installed on the ROM 102 or the storage unit 108.

Note that the program executed by the computer 100 may be a program that performs processes chronologically in the order described in this specification, or may be a program that performs processes in parallel or at required timing such as when a call is issued.

The embodiment of the present disclosure is not limited to the above-described one, and various changes may be made thereto without departing from the true spirit and scope of the present disclosure.

The present disclosure can also employ configurations such as those shown below.

(1)

A content supply apparatus that delivers content as a mosaic channel, the content supply apparatus including:

a combining unit that generates mosaic CH streaming data by disposing pieces of video of a plurality of pieces of content in a plurality of areas, respectively, and combining the pieces of video together, the plurality of pieces of content being delivered through different viewing channels, and the plurality of areas being obtained by dividing a screen;

a mosaic CH segment stream generating unit that generates a mosaic CH segment stream based on the generated mosaic CH streaming data, the mosaic CH segment stream being switchable to/from another mosaic channel at a minimum delay time;

a USD generating unit that generates a USD having introduced therein a mosaic element related to a screen configuration of the mosaic CH segment stream; and a multicasting unit that multicasts the mosaic CH segment stream and the USD.

(2)

The content supply apparatus according to (1), wherein the USD generating unit generates, as the USD, an extended-HTML inclusion type USD including an extended HTML element, or an extended-HTML reference type USD including a reference to a file of the extended HTML element, the extended HTML element describing information about the screen configuration of the mosaic CH segment stream.

(3)

The content supply apparatus according to (1) or (2), further including a unicasting unit that unicasts the mosaic CH segment stream and the USD.

(4)

The content supply apparatus according to (3), further including an MPD generating unit that generates an MPD, the MPD being information for a receiver to receive the mosaic CH segment stream, wherein the multicasting unit also multicasts the MPD, and
the unicasting unit also unicasts the MPD.

(5)

The content supply apparatus according to any one of (1) to (4), wherein the USD generating unit generates the USD in which an attribute is extended, the attribute indicating that the mosaic CH segment stream is switchable to/from another mosaic channel at the minimum delay time.

(6)

The content supply apparatus according to any one of (1) to (5), wherein the mosaic CH segment stream generating unit generates the mosaic CH segment stream by dividing the generated mosaic CH streaming data according to timing and segment length, the mosaic CH segment stream being switchable to/from another mosaic channel at the minimum delay time, and the timing and the segment length being uniform between the mosaic channel and the another mosaic channel.

(7)

The content supply apparatus according to any one of (1) to (5), wherein the mosaic CH segment stream generating unit generates the mosaic CH segment stream by making a cycle of switchable boundaries of the generated mosaic CH streaming data sufficiently short, the mosaic CH segment stream being switchable to/from another mosaic channel at the minimum delay time.

(8)

The content supply apparatus according to any one of (3) to (7), wherein the unicasting unit HTTP-unicasts the mosaic CH segment stream, and
the multicasting unit FLUTE-multicasts a mosaic CH FLUTE stream generated based on the mosaic CH segment stream.

(9)

The content supply apparatus according to any one of (1) to (8), further including an RTP stream generating unit that generates a mosaic CH RTP stream based on the mosaic CH streaming data, wherein the multicasting unit also RTP-multicasts the mosaic CH RTP stream.

(10)

A content supply method for a content supply apparatus that delivers content as a mosaic channel, the content supply method including:

a combining step of generating mosaic CH streaming data by disposing pieces of video of a plurality of pieces of content in a plurality of areas, respectively, and combining the pieces of video together, the plurality of pieces of content being delivered through different viewing channels, and the plurality of areas being obtained by dividing a screen;

a mosaic CH segment stream generating step of generating a mosaic CH segment stream, based on the generated mosaic CH streaming data, the mosaic CH segment stream being switchable to/from another mosaic channel at a minimum delay time;

a USD generating step of generating a USD having introduced therein a mosaic element related to a screen configuration of the mosaic CH segment stream; and a multicasting step of multicasting the mosaic CH segment stream and the USD, the steps being performed by the content supply apparatus.

(11)

A program causing a computer that delivers content as a mosaic channel, to function as:

a combining unit that generates mosaic CH streaming data by disposing pieces of video of a plurality of pieces of content in a plurality of areas, respectively, and combining the pieces of video together, the plurality of pieces of content being delivered through different viewing channels, and the plurality of areas being obtained by dividing a screen;

a mosaic CH segment stream generating unit that generates a mosaic CH segment stream, based on the generated mosaic CH streaming data, the mosaic CH segment stream being switchable to/from another mosaic channel at a minimum delay time;

a USD generating unit that generates a USD having introduced therein a mosaic element related to a screen configuration of the mosaic CH segment stream; and a multicasting unit that multicasts the mosaic CH segment stream and the USD.

(12)

A terminal apparatus that receives and plays back content delivered as a mosaic channel from a content supply apparatus including:

a combining unit that generates mosaic CH streaming data by disposing pieces of video of a plurality of pieces of content in a plurality of areas, respectively, and combining the pieces of video together, the plurality of pieces of content being delivered through different viewing channels, and the plurality of areas being obtained by dividing a screen;

a mosaic CH segment stream generating unit that generates a mosaic CH segment stream, based on the generated mosaic CH streaming data, the mosaic CH segment stream being switchable to/from another mosaic channel at a minimum delay time;

a USD generating unit that generates a USD having introduced therein a mosaic element related to a screen configuration of the mosaic CH segment stream; and a multicasting unit that multicasts the mosaic CH segment stream and the USD, the terminal apparatus being configured to receive the USD and the mosaic CH segment stream, and receive and play back, according to a user operation to select an area on the screen, a stream of content of a viewing channel corresponding to the selected area, the screen playing back the mosaic CH segment stream.

(13)

A content supply system including: a content supply apparatus that delivers content as a mosaic channel; and a terminal apparatus that receives and plays back the content delivered from the content supply apparatus, wherein the content supply apparatus includes:

a combining unit that generates mosaic CH streaming data by disposing pieces of video of a plurality of pieces of content in a plurality of areas, respectively, and combining the pieces of video together, the plurality of pieces of content being delivered through different viewing channels, and the plurality of areas being obtained by dividing a screen;

a mosaic CH segment stream generating unit that generates a mosaic CH segment stream based on the generated mosaic CH streaming data, the mosaic CH segment stream being switchable to/from another mosaic channel at a minimum delay time;

a USD generating unit that generates a USD having introduced therein a mosaic element related to a screen configuration of the mosaic CH segment stream; and a multicasting unit that multicasts the mosaic CH segment stream and the USD, and the terminal apparatus is configured to receive the USD and the mosaic CH segment stream, and receive and play back, according to a user operation to select an area on the screen, a stream of content of a viewing channel corresponding to the selected area, the screen playing back the mosaic CH segment stream.

REFERENCE SIGNS LIST

20 Viewing CH apparatus
50 Content supply system
51 Network
52 NTP server
60 Mosaic CH apparatus
61 Mosaic CH builder
62 Mosaic CH segmenter
63 Mosaic CH USD generator
64 RTP streamer
65 FLUTE streamer
66 WEB server
67 Multicast server
80 Terminal apparatus
100 Computer
101 CPU

The invention claimed is:

1. A content supply apparatus that delivers content as a mosaic channel, the content supply apparatus comprising:

circuitry configured to generate mosaic streaming data by disposing pieces of video of a plurality of pieces of content in a plurality of areas, respectively, and combining the pieces of video together, the plurality of pieces of content being delivered through different viewing channels, and the plurality of areas being obtained by dividing a screen;

generate a mosaic segment stream based on the generated mosaic streaming data by dividing the generated mosaic streaming data according to timing and segment length, the timing and the segment length being uniform between the mosaic channel and an another mosaic channel, the mosaic segment stream being switchable to/from another mosaic channel at a delay time based on the timing and segment length;

generate a metafile having introduced therein a mosaic element related to a screen configuration of the mosaic segment stream; and multicast the mosaic segment stream and the metafile, wherein the circuitry generates the mosaic segment stream by dividing the generated mosaic streaming data according to timing and segment length, the mosaic segment stream being switchable to/from another mosaic channel at the delay time, and the timing and the segment length being uniform between the mosaic channel and the another mosaic channel.

2. The content supply apparatus according to claim 1, wherein the circuitry generates, as the metafile, an extended-HTML inclusion type metafile including an extended HTML element, or an extended-HTML reference type metafile including a reference to a file of the extended HTML element, the extended HTML element describing information about the screen configuration of the mosaic segment stream.

3. The content supply apparatus according to claim 2, wherein the circuitry unicasts the mosaic segment stream and the metafile.

4. The content supply apparatus according to claim 3, wherein the circuitry is configured to generate Media Presentation Description (MPD), the MPD being information for a receiver to receive the mosaic segment stream, wherein the circuitry multicasts the MPD, and
unicasts the MPD.

5. The content supply apparatus according to claim 2, wherein the circuitry generates the metafile in which an attribute is extended, the attribute indicating that the mosaic segment stream is switchable to/from another mosaic channel at the delay time.

6. The content supply apparatus according to claim 2, wherein the circuitry generates the mosaic segment stream by making a cycle of switchable boundaries of the generated mosaic streaming data sufficiently short, the mosaic segment stream being switchable to/from another mosaic channel at the delay time.

7. The content supply apparatus according to claim 2, wherein the circuitry
HTTP-unicasts the mosaic segment stream, and
FLUTE-multicasts a mosaic FLUTE stream generated based on the mosaic segment stream.

8. The content supply apparatus according to claim 2, wherein the circuitry generates a mosaic Real-time Transport Protocol (RTP) stream based on the mosaic streaming data, and RTP-multicasts the mosaic RTP stream.

9. A content supply method for a content supply apparatus that delivers content as a mosaic channel, the content supply method comprising:

generating mosaic streaming data by disposing pieces of video of a plurality of pieces of content in a plurality of areas, respectively;

combining the pieces of video together, the plurality of pieces of content being delivered through different viewing channels, and the plurality of areas being obtained by dividing a screen;

generating, via circuitry, a mosaic segment stream, based on the generated mosaic streaming data by dividing the generated mosaic streaming data according to timing and segment length, the timing and the segment length being uniform between the mosaic channel and an another mosaic channel, the mosaic segment stream being switchable to/from another mosaic channel at a delay time based on the timing and segment length;

generating, via the circuitry, a metafile having introduced therein a mosaic element related to a screen configuration of the mosaic segment stream; and multicasting the mosaic segment stream and the metafile, the steps being performed by the content supply apparatus.

10. A non-transitory computer-readable medium having stored thereon computer-readable instructions which when executed by a computer cause the computer to perform a method comprising:

generating mosaic streaming data by disposing pieces of video of a plurality of pieces of content in a plurality of areas, respectively;

combining the pieces of video together, the plurality of pieces of content being delivered through different viewing channels, and the plurality of areas being obtained by dividing a screen;

generating a mosaic segment stream, based on the generated mosaic streaming data by dividing the generated mosaic streaming data according to timing and segment length, the timing and the segment length being uniform between the mosaic channel and an another mosaic channel, the mosaic segment stream being switchable to/from another mosaic channel at a delay time based on the timing and segment length;

generating a metafile having introduced therein a mosaic element related to a screen configuration of the mosaic segment stream; and multicasting the mosaic segment stream and the metafile.

11. A receiving device that receives and plays back content delivered as a mosaic channel, the receiving device including:

circuitry configured to receive a mosaic segment stream generated from mosaic streaming data, which was generated by disposing pieces of video of a plurality of pieces of content in a plurality of areas, respectively, and combining the pieces of video together, the plurality of pieces of content being from different viewing channels, and the plurality of areas respectively representing divisions of a screen;

the mosaic segment stream being generated by dividing the mosaic streaming data according to timing and segment length, the timing and the segment length being uniform between the mosaic channel and an another mosaic channel, the mosaic segment stream being switchable to/from another mosaic channel at a delay time based on the timing and segment length;

receive a metafile having introduced therein a mosaic element related to a screen configuration of the mosaic segment stream; and receive and play back, according to a user operation to select an area on the screen, a stream of content of a viewing channel corresponding to the selected area, the screen playing back the mosaic segment stream.

12. A content supply system comprising:
a content supply apparatus that delivers content as a mosaic channel; and a receiver that receives and plays back the content delivered from the content supply apparatus, wherein the content supply apparatus includes circuitry configured to:

generate mosaic streaming data by disposing pieces of video of a plurality of pieces of content in a plurality of areas, respectively, and combining the pieces of video together, the plurality of pieces of content being delivered through different viewing channels, and the plurality of areas being obtained by dividing a screen;

generate a mosaic segment stream based on the generated mosaic streaming data by dividing the generated mosaic streaming data according to timing and segment length, the timing and the segment length being uniform between the mosaic channel and an another mosaic channel, the mosaic segment stream being switchable to/from another mosaic channel at a minimum delay time based on the timing and segment length;

generate a metafile having introduced therein a mosaic element related to a screen configuration of the mosaic segment stream; and multicast the mosaic segment stream and the metafile, wherein the receiver is configured to receive the metafile and the mosaic segment stream, and receive and play back, according to a user operation to select an area on the screen, a stream of content of a viewing channel corresponding to the selected area, the screen playing back the mosaic segment stream.

13. The content supply apparatus according to claim 1, wherein the generated mosaic streaming data is divided according to timing by synchronizing the limits of segments with a network time protocol (NTP) time base.

14. The receiving device according to claim 11, wherein the circuitry is configured to receive the mosaic segment stream and the metafile from unicast.

15. The receiving device according to claim 11, wherein the metafile includes an attribute indicating that the mosaic segment stream is switchable to/from another mosaic channel at the delay time.

16. A receiving method comprising:

receiving a mosaic segment stream generated from mosaic streaming data, which was generated by disposing pieces of video of a plurality of pieces of content in a plurality of areas, respectively, and combining the pieces of video together, the plurality of pieces of content being from different viewing channels, and the plurality of areas respectively representing divisions of a screen, the mosaic segment stream being generated by dividing the mosaic streaming data according to timing and segment length, the timing and the segment length being uniform between the mosaic channel and another mosaic channel, the mosaic segment stream being switchable to/from another mosaic channel at a delay time based on the timing and segment length;

receiving a metafile having introduced therein a mosaic element related to a screen configuration of the mosaic segment stream; and receiving and playing back, according to a user operation to select an area on the screen, a stream of content of a viewing channel corresponding to the selected area, the screen playing back the mosaic segment stream.

17. The receiving method according to claim 16, wherein the mosaic segment stream and the metafile are received from unicast.

18. The receiving method according to claim 16, wherein the metafile includes an attribute indicating that the mosaic segment stream is switchable to/from another mosaic channel at the delay time.

19. A non-transitory computer-readable medium having stored thereon computer-readable instructions which when executed by a computer cause the computer to perform a method comprising:

receiving a mosaic segment stream generated from mosaic streaming data, which was generated by disposing pieces of video of a plurality of pieces of content in a plurality of areas, respectively, and combining the pieces of video together, the plurality of pieces of content being from different viewing channels, and the plurality of areas respectively representing divisions of a screen, the mosaic segment stream generated by dividing the mosaic streaming data according to timing and segment length, the timing and the segment length being uniform between the mosaic channel and an another mosaic channel, the mosaic segment stream being switchable to/from another mosaic channel at a delay time based on the timing and segment length;

receiving a metafile having introduced therein a mosaic element related to a screen configuration of the mosaic segment stream; and receiving and playing back, according to a user operation to select an area on the screen, a stream of content of a viewing channel corresponding to the selected area, the screen playing back the mosaic segment stream.

* * * * *